United States Patent
Guyot-Sionnest et al.

(10) Patent No.: US 8,125,440 B2
(45) Date of Patent: Feb. 28, 2012

(54) METHOD AND DEVICE FOR CONTROLLING AND INPUTTING DATA

(75) Inventors: Laurent Guyot-Sionnest, Paris (FR); Simone Mazzoni, Paris (FR)

(73) Assignee: Tiki'Labs, Paris (FR)

( * ) Notice: Subject to any disclaimer, the term of this patent is extended or adjusted under 35 U.S.C. 154(b) by 1227 days.

(21) Appl. No.: 11/791,406

(22) PCT Filed: Nov. 18, 2005

(86) PCT No.: PCT/FR2005/002878
§ 371 (c)(1),
(2), (4) Date: Jul. 18, 2007

(87) PCT Pub. No.: WO2006/053991
PCT Pub. Date: May 26, 2006

(65) Prior Publication Data
US 2008/0015115 A1  Jan. 17, 2008

(30) Foreign Application Priority Data

Nov. 22, 2004 (FR) .................................... 04 52712
Aug. 9, 2005 (FR) .................................... 05 08462

(51) Int. Cl.
  *G09G 5/00*  (2006.01)
  *G06F 3/041*  (2006.01)
(52) U.S. Cl. ...................................... 345/156; 345/173
(58) Field of Classification Search .................. 345/156, 345/173
  See application file for complete search history.

(56) References Cited

U.S. PATENT DOCUMENTS

| 4,344,069 A | 8/1982 | Prame |
| 5,087,910 A | 2/1992 | Guyot-Sionnest |
| 5,535,421 A * | 7/1996 | Weinreich ..................... 710/67 |
| 6,107,997 A * | 8/2000 | Ure ............................... 345/173 |
| 6,333,734 B1 * | 12/2001 | Rein .............................. 345/169 |
| 2001/0028340 A1 * | 10/2001 | Mailman ........................ 345/156 |
| 2002/0015024 A1 * | 2/2002 | Westerman et al. ............ 345/173 |
| 2003/0063775 A1 | 4/2003 | Rafii et al. |
| 2004/0006455 A1 * | 1/2004 | Fux et al. ......................... 704/4 |
| 2005/0198179 A1 * | 9/2005 | Savilampi ..................... 709/206 |
| 2006/0242607 A1 * | 10/2006 | Hudson ......................... 715/863 |

FOREIGN PATENT DOCUMENTS

| EP | 0213022 A1 | 3/1987 |
| WO | 97/23816 A | 7/1997 |

\* cited by examiner

*Primary Examiner* — Amare Mengistu
*Assistant Examiner* — Aaron M Guertin
(74) *Attorney, Agent, or Firm* — Osha • Liang LLP

(57) ABSTRACT

A method of entering combinatorial data on a data entry device (DED) including sensitive means which can be activated by an intermediary of at least one actuator allowing, according to a combination of sensitive means activated, an ad hoc computer program to designate and activate an object contained in a active correspondence table in memory, where the sensitive means are made up by at least three main detection zones $Z_i$ each made up of $F_i$ ($F_i$=1, 2, 3 . . . ) distinct sensitive zones, comprising at least one step of designating/selecting an object from an active table; and a subsequent step of validation and production of the designated object, wherein for at least a first part of objects from the active table, the step of designation/selection of a single object can be achieved by designation of the object in successive combinatorial mode or by designation of the object in simultaneous combinatorial mode.

22 Claims, 24 Drawing Sheets

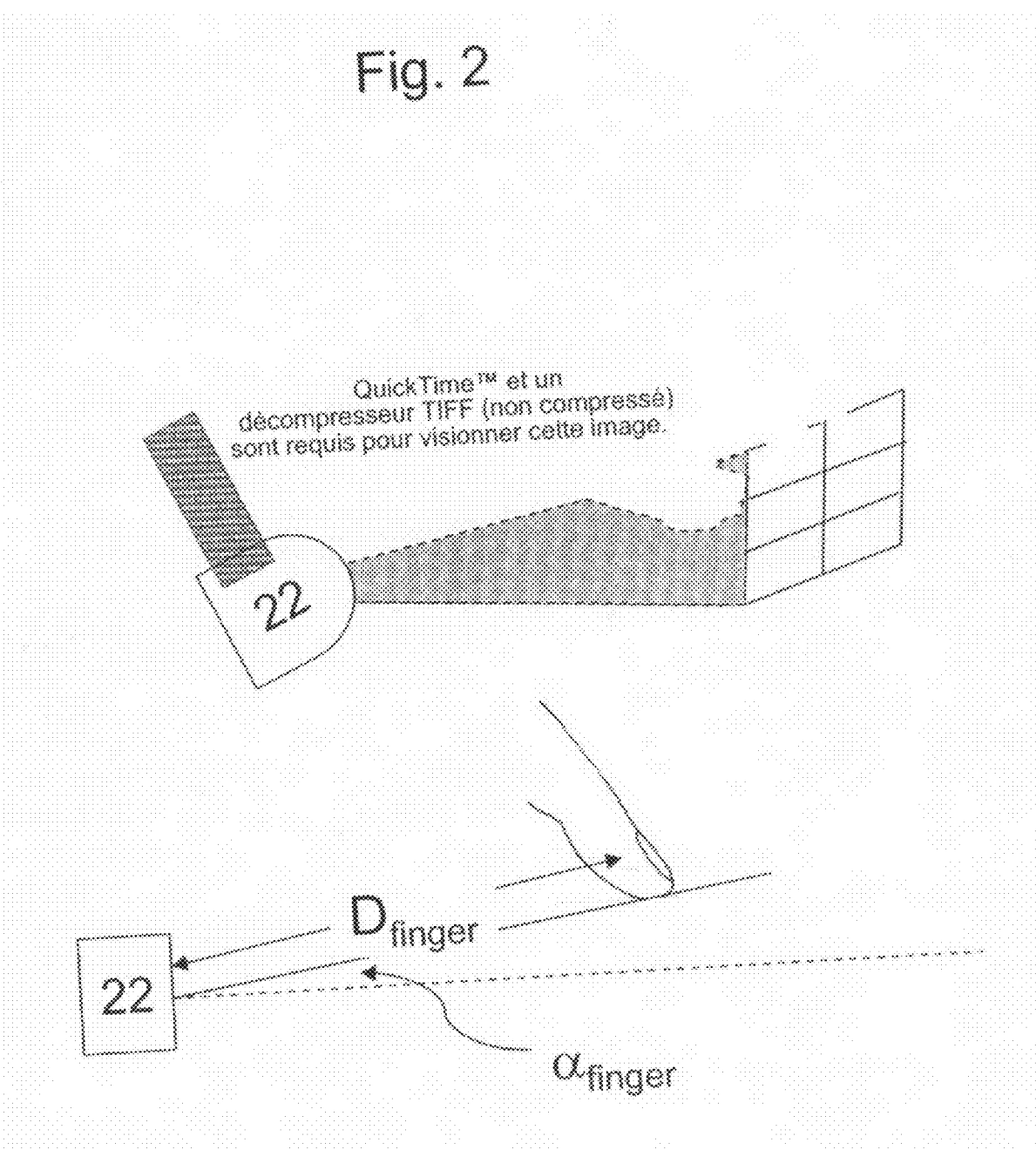

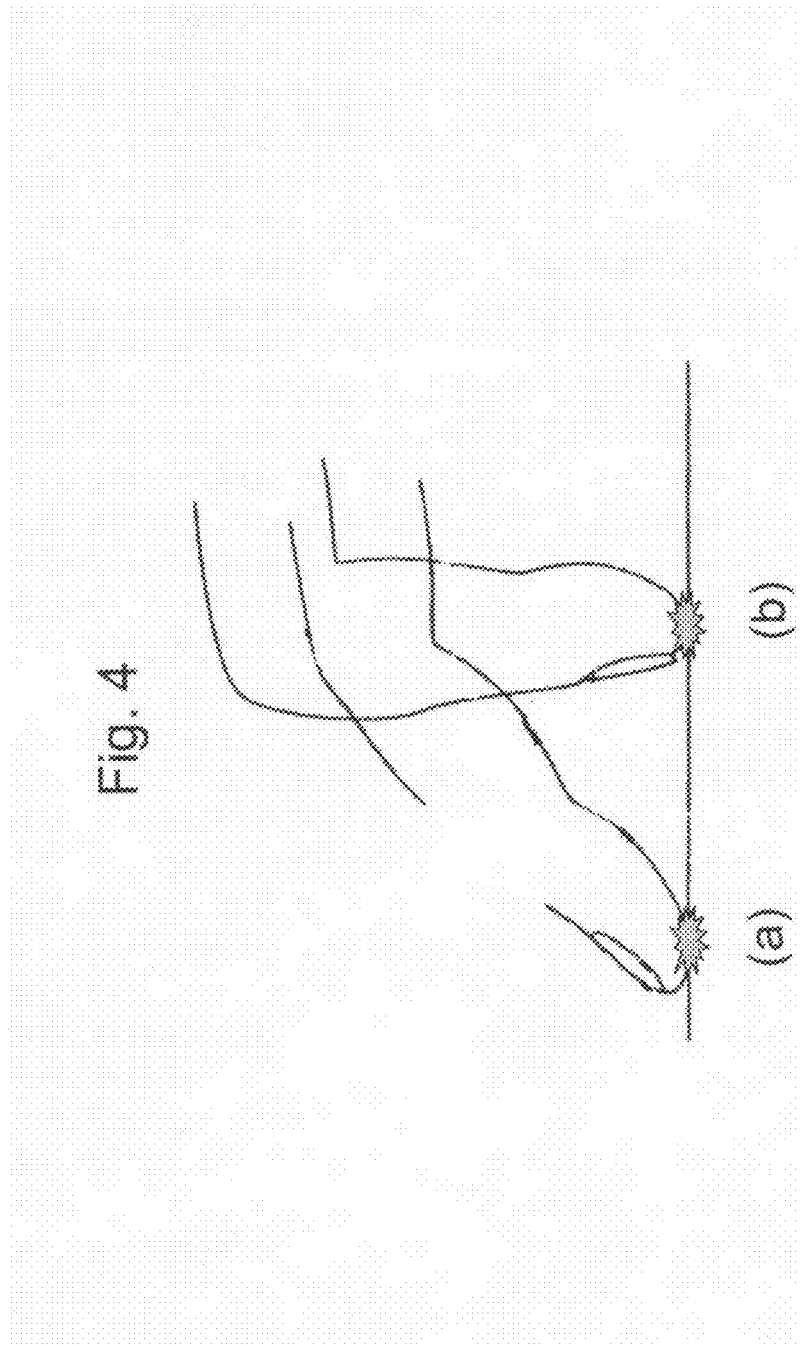

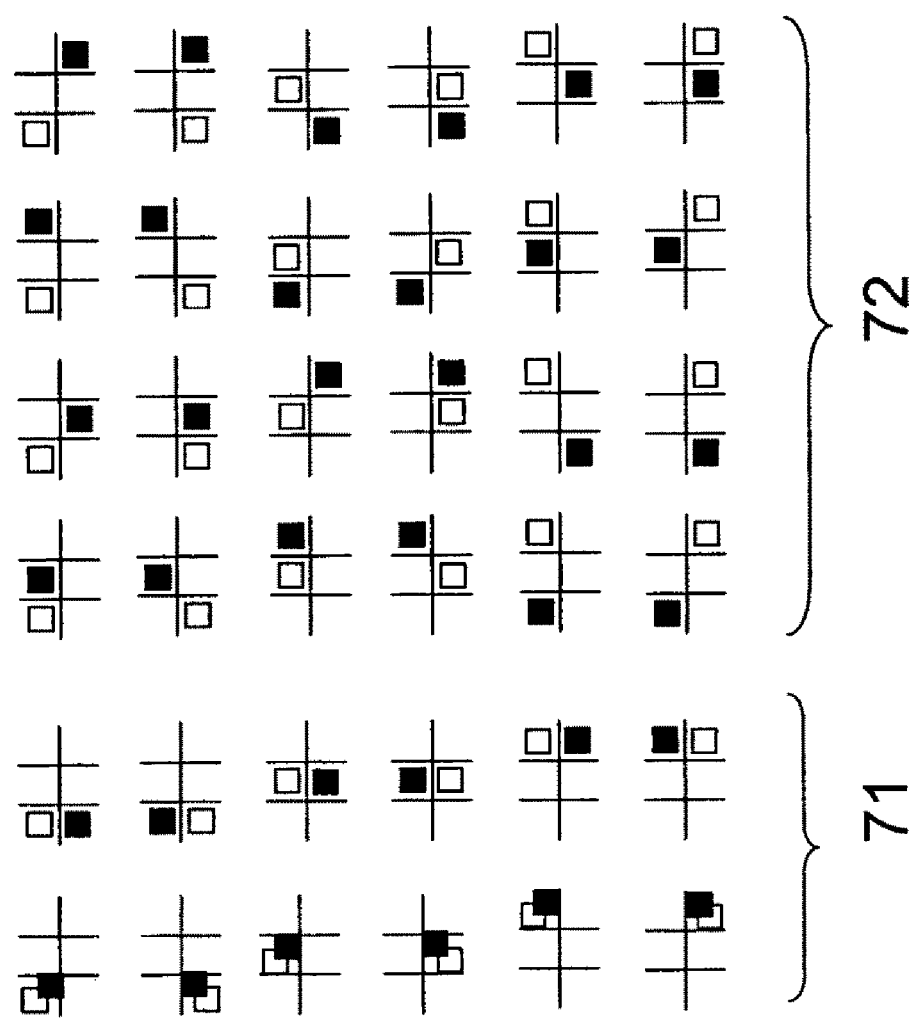

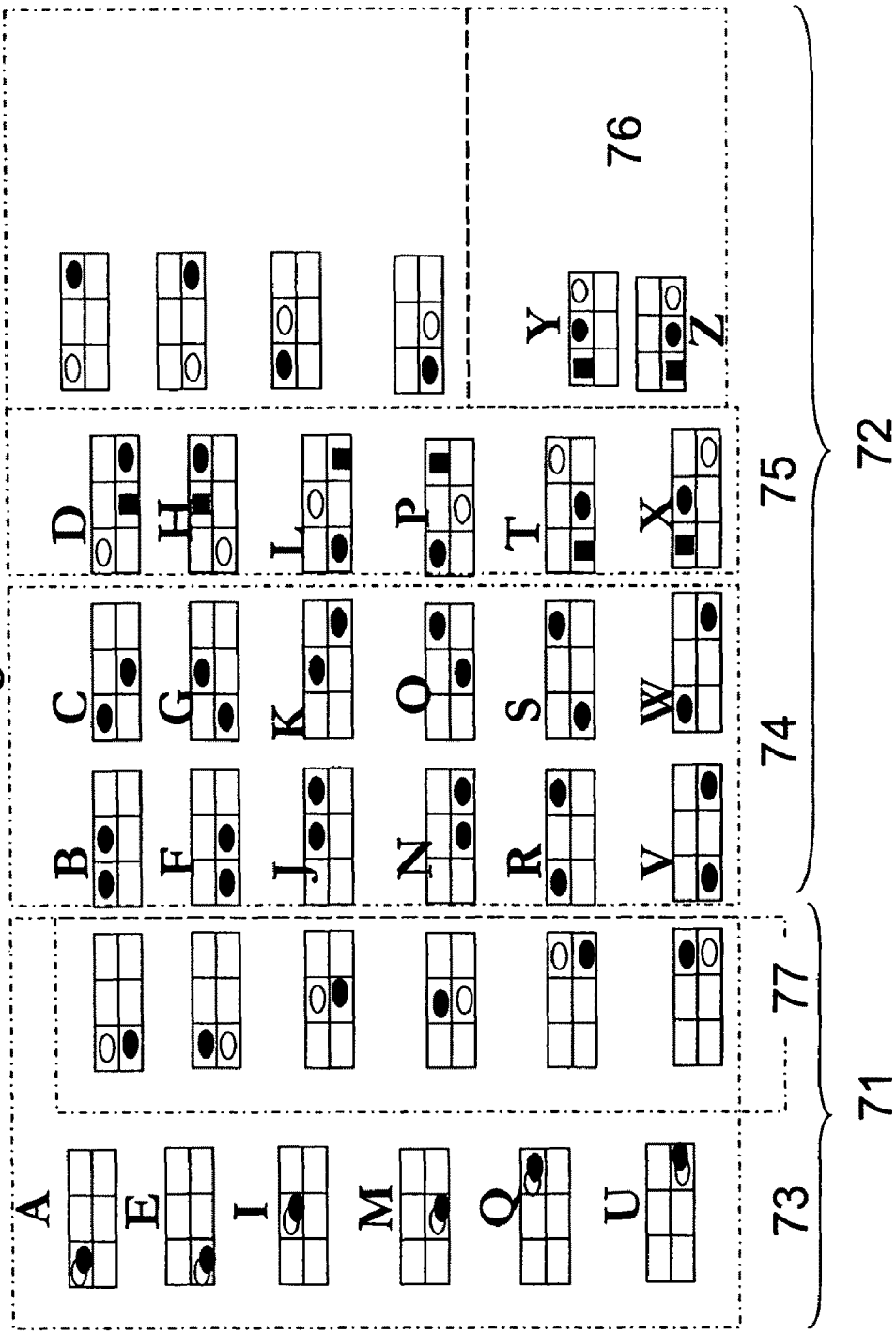

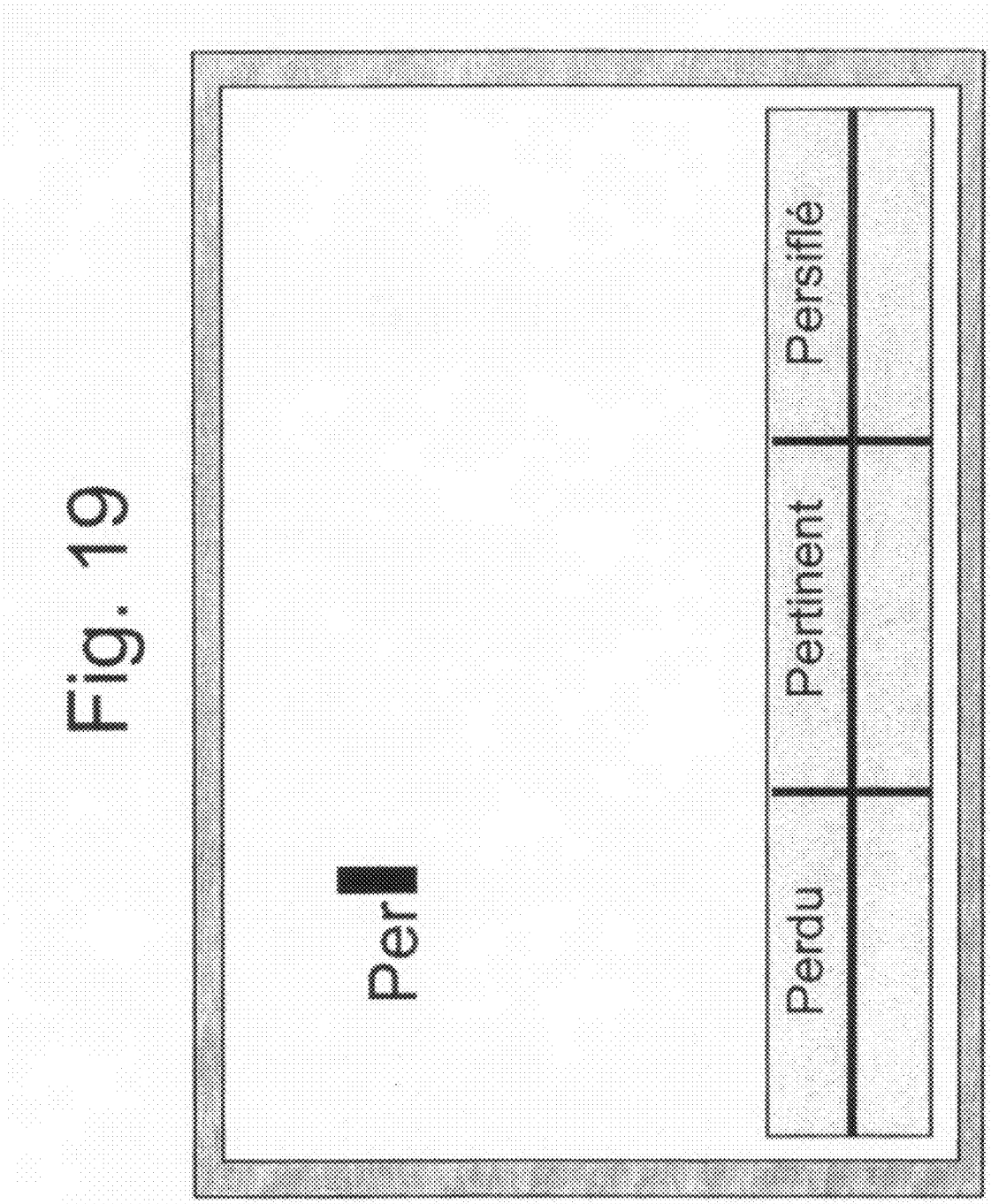

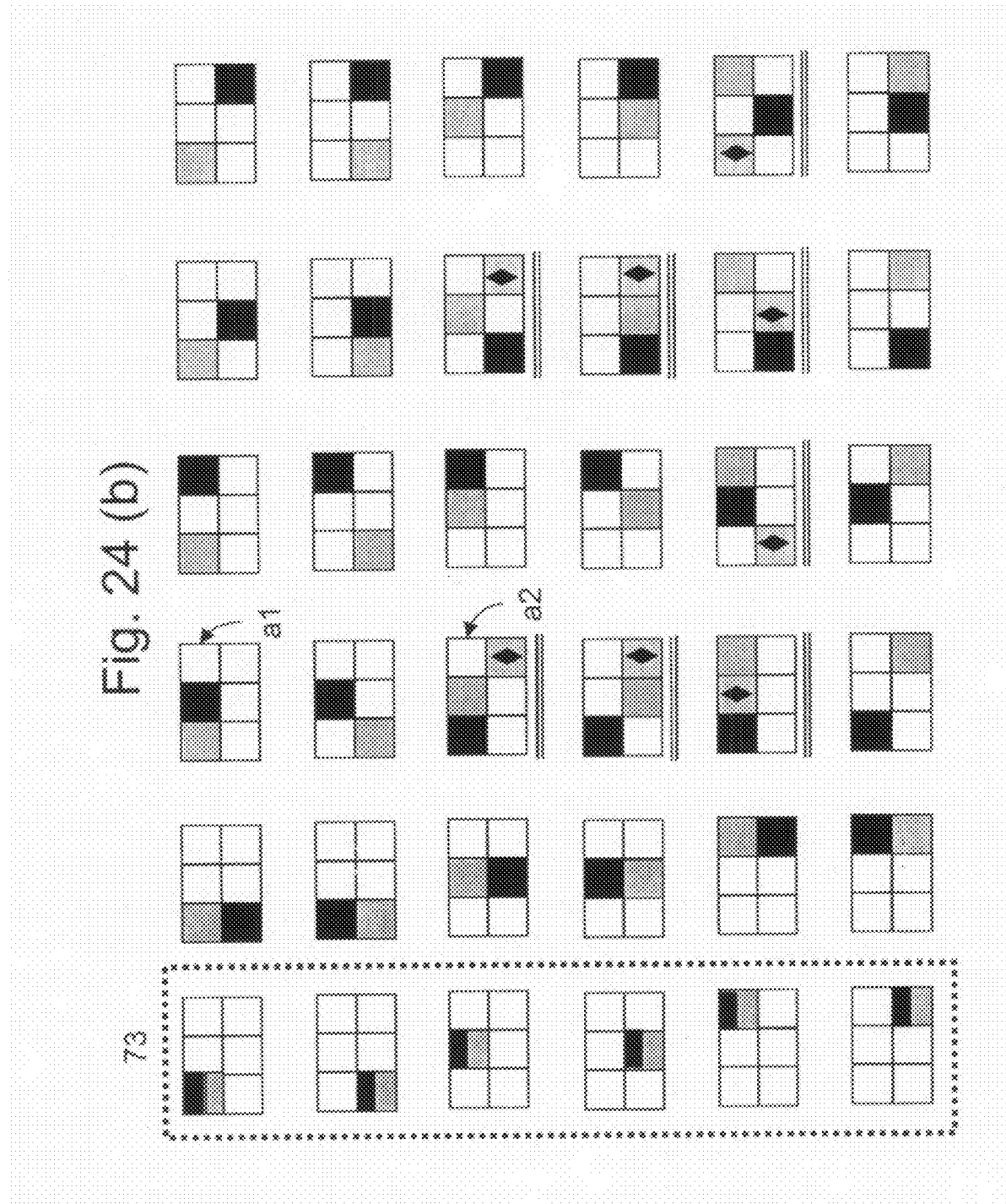

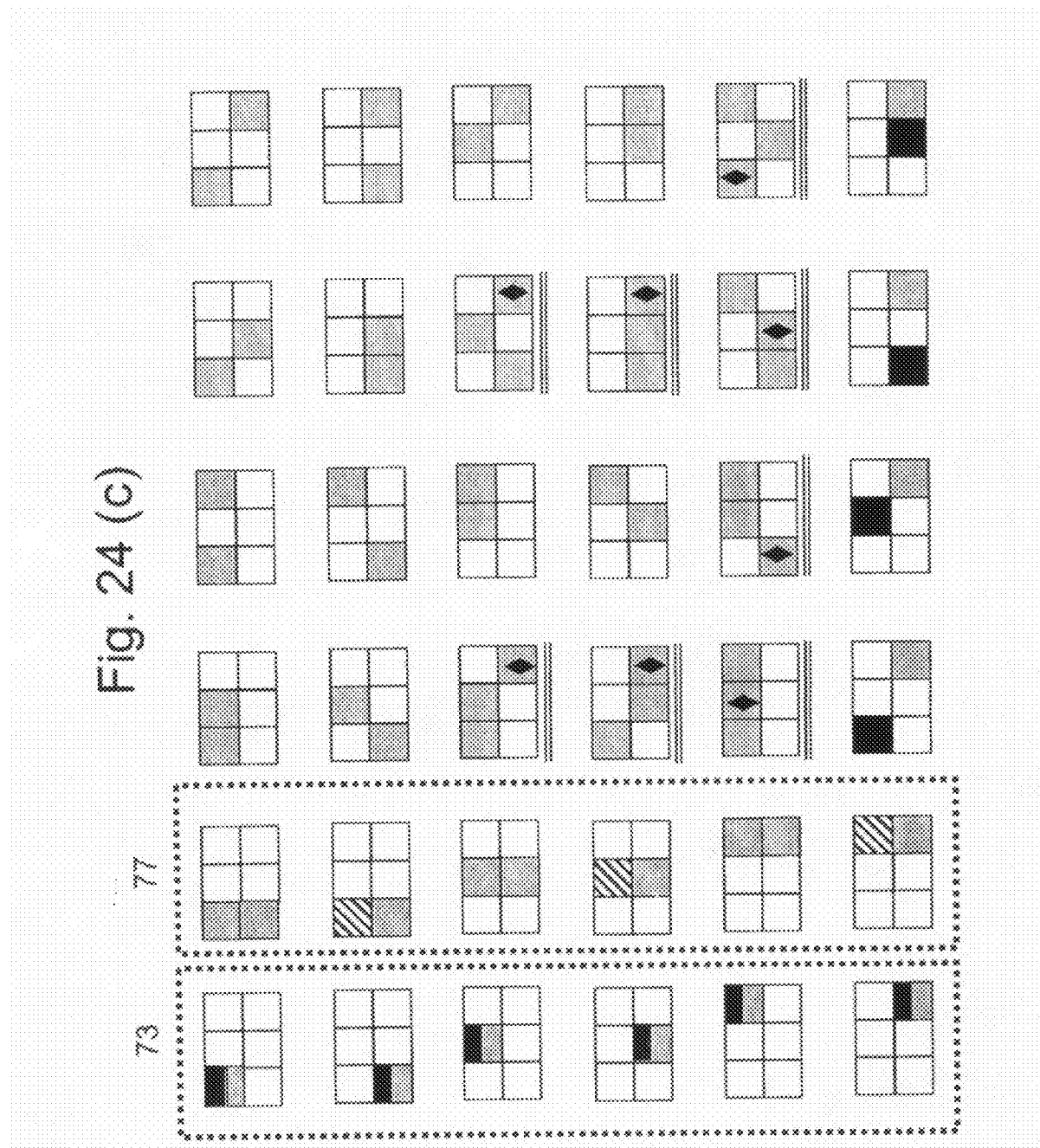

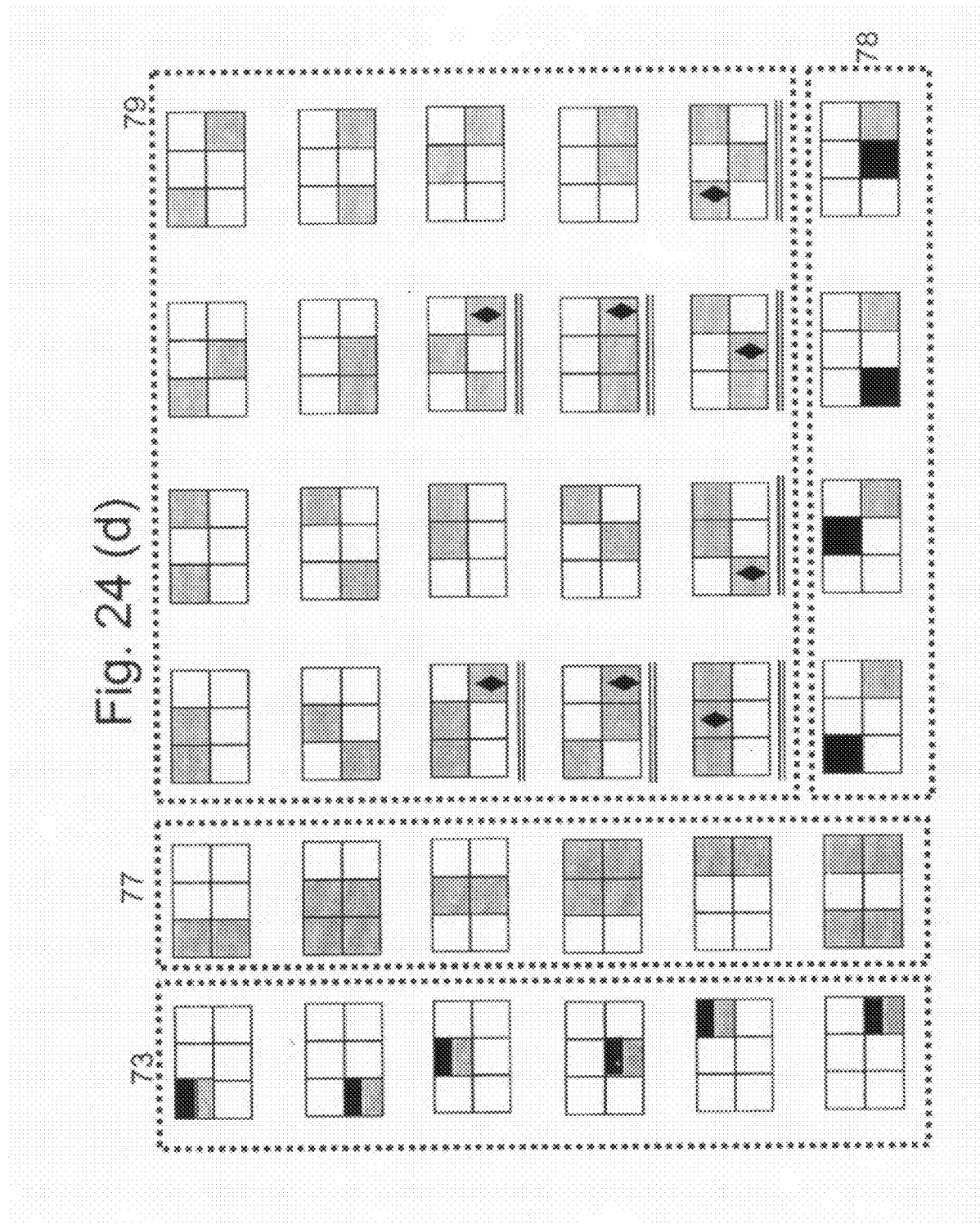

METHOD AND DEVICE FOR CONTROLLING AND INPUTTING DATA

RELATED APPLICATION

This is a §371 of International Application No. PCT/FR2005/002878, with an international filing date of Nov. 18, 2005 (WO 2006/053991, published May 26, 2006), which is based on French Patent Application Nos. 04/52712, filed Nov. 22, 2004, and 05/08462, filed Aug. 9, 2005.

TECHNICAL FIELD

This disclosure relates to command and data entry devices and methods (DED) in an electronic, computer or other system, and more specifically combinatorial methods providing for simultaneous or successive concurrent designation of key combinations.

BACKGROUND

Many chording keyboards, in particular, the one described in FR85/11532 (Guyot-Sionnest), are already known.

From U.S. Pat. No. 4,344,069, US 2003/063775, U.S. Pat. No. 5,535,421, WO 97/23816 and "HP48 G Series User's Manual" the following are already known, respectively:
- a device making it possible to generate characters by successively pressing two keys, where the character is produced upon raising the second key,
- a device making it possible to evaluate and calculate three-dimensional distances in applications such as virtual keyboards,
- guiding device for a keyboard user where the guiding consists of displaying the production means activated by the user and the character produced by the means activated,
- a computer method for user identification according to their behavioral profile, and
- a user manual for a calculator which assigns several producible characters by a single key by means of one or more selection keys (α key).

The drawback of these solutions resides in the fact that they are not suited for being used both by a novice who is taking time to learn the device's operation and an expert who seeks performance from the device. In fact, because of its complexity and burden, the first step of discovering and learning chording keyboards always rebuffed the user who most often abandoned it. No initial guidance or even adaptation as a function of the user's dexterity and hesitations is offered. None of these solutions proposes unique equipment making it possible to unite the production of objects via a simultaneous and successive key activation mode.

SUMMARY

We provide a method of entering combinatorial data on a data entry device (DED) including sensitive means which can be activated by an intermediary of at least one actuator allowing, according to a combination of sensitive means activated, an ad hoc computer program to designate and activate an object contained in an active correspondence table in memory, where the sensitive means are made up by at least three main detection zones Zi, each made of Fi (Fi=1, 2, 3 . . . ) distinct sensitive zones, including at least one step of designating/selecting an object from an active table, and a subsequent step of validation and production of the designated object, wherein for at least a first part of objects from the active table, the step of designation/selection of a single object can be achieved by designation of the object in successive combinatorial mode or by designation of the object in simultaneous combinatorial mode.

We also provide a data entry device (DED) including sensitive means that can be activated through at least one actuator, making it possible, according to a combination of sensitive means activated for an ad hoc computer program to designate and activate one object contained in a box from an active table in memory, where the sensitive means are made up of at least three main detection zones Zi, each one made up of (Fi=1, 2, 3 . . . ) distinct logical zones, and software and memory, wherein the memory stores at least one active table and computer code and the software executes the computer code and are suited to process activation information from the sensitive zones in an undistinguished pure Bitap successive mode, successive or simultaneous and to produce the designated object after the validation of the combination of sensitive zones activated.

We further provide a data entry system including the data entry device DED and computing equipment, the DEDs concurrently piloting through the objects produced by them, the computer equipment to which they are connected.

We still further provide a computer program that implements the method of entering combinatorial data on a data entry device (DED) including a plurality of instructions that process information for designation/deselection of the logical zones and produce an object as a function of the designated logical zones in successive or simultaneous combinatorial mode when a user validates the selection.

BRIEF DESCRIPTION OF THE DRAWINGS

Our disclosure will be better understood with the help of the description, made below purely for explanation, of selected, representative aspects by reference to the attached figures where:

FIGS. 1, 2, 3, 9 and 10 show devices for controlling and inputting data;

FIG. 4 illustrates an example of tactile feedback, provided by two different positions of the fingertips;

FIGS. 5, 6, 7 and 8 illustrate examples of strips or tables of objects (generally alphanumeric characters) implemented by user;

FIG. 19 illustrates how visual guding makes it possible to increase the usefulness of the semantic correction and prediction software;

FIGS. 24a to 24d representa combination activation tables coexisting on a single piece of equipment to make it accessible both to a beginner and an expert.

DETAILED DESCRIPTION

Figure 3:
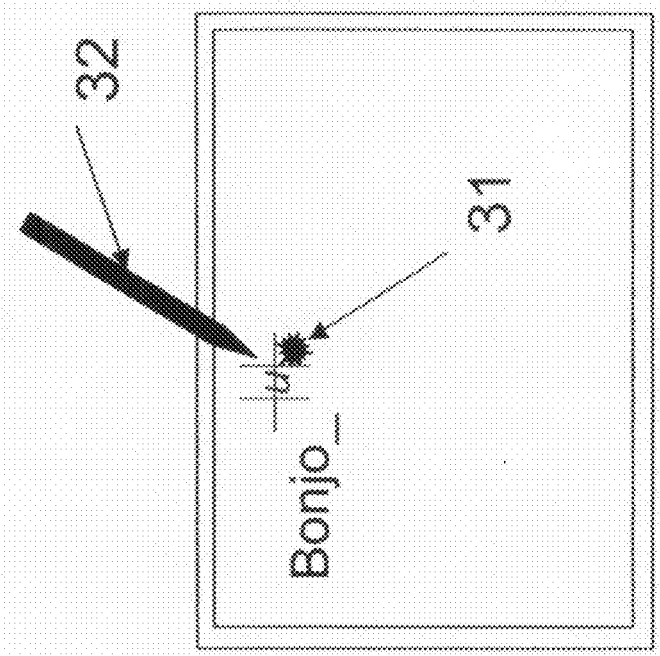

We provide for command and data entry devices, in particular, chording keyboards making it possible for the user with a single device to find benefit in its beginning or expert performance. We offer a universal command and data entry device, combined with a pointing device for graphical HMI, staying under a single hand or even under a single finger such as the thumb, able to suit any computer or electronic device and based on the combined action broadly interpreted on a reduced number of sensitive zones capable of providing information with which computer programs will be able to determine the position and movements of the fingers of one hand or of any actuator handled by the user. The combinations or successions of sensitive zones activated are interpreted by another program which can be configured according to the preferences and contexts in which the user is situated and interpreting tables configured for the user in which computer objects, with their execution elements, at least one symbolic representation and at least one label of comments according to the known example of icons and scrolling menus for Graphical User Interfaces are arranged.

In particular, we provide for the mass market beginner to start in a few minutes while allowing that beginner to progress naturally with use towards a simultaneous mode, whatever the grammar!

To facilitate the exploration of the contents of the tables and facilitate the user's capacity to designate and activate a significant number of objects quickly and without having to memorize them in advance, we provide means, which are configurable according to the user's expertise, needs or preferences, for symbolic presentation of tables containing the objects. These means immediately indicate to the user the positions of the fingers or actuators allowing the designation of the address in the active table of the target object (which sensitive zones to activate), what at a given moment are the sensitive zones that the system considers as activated and what objects can be designated with the zones already active and others that can be added to the combination being built. The system is a kind of transposition of the operation of graphical HMIs, with the important difference that the DED makes it possible, if the user sees an advantage in it, of avoiding having to move the electronic pointer on the screen and above the computer objects which are shown by icons, or fixed or scrolling menu items, but only moving the available fingers or actuators between different sensitive zones.

To perfect this integration of a multifunction HMI under the user's hand for any computer or electronic device, in or next to sensitive zones, we integrate means for tracking the movements of one or several actuators for linking them to electronic pointers according to the state-of-the-art.

To make it possible for the user to make use of the input devices and the means of production the best suited to each mobility context all while reusing the same designation reference for the objects, we introduce a canonical common symbolic representation mode linked to the universal morphology of the human hand, combinations corresponding to the designation addresses in the tables of boxes where the objects to be activated are laid out, which can be shared by several types of combinations and several modes of production of these combinations and for which it is possible to advance that this symbolic representation of the addresses constitutes in some way a writing which could also have a cursive form or by points, electronic, virtual or material on paper or other media. This canonical symbolic representation moves away from prior writing systems which had as their basis stylization of the designated object, in that it takes as a starting point a symbolic representation of the simple positioning possibilities of each finger of a human hand.

The method responds particularly well to the simultaneous needs of a person for discreet, comfortable and quick entry in any location, any position and any time, and for integration in small sized devices which are proliferating such as mobile telephones, personal assistants and multimedia listening and recording devices. We also make it possible to provide a single object production solution which adapts equally well to the performance of a beginner and that of an expert without requiring a change of equipment.

It is understood that the technical aspects previously raised and amply described in what follows could be the object of a specific protection, each of these aspects being independently protected. Note the importance of:

the mechanisms making it possible to provide to the device the universal and personal functionalities making it possible to very flexibly control any electronic object remotely controllable from the exterior, technical mechanisms and means for the operation and interactive guiding making it possible to indicate, illustrate, and comment, on the screen or by audio or tactile means what positions of the fingers correspond to an object or a group of objects and to do that in a manner configurable according to the choices and performance of the user from a continuous guidance to an optional guidance appearing when certain hesitations are perceived by the system, technical mechanisms and means for learning and coaching for the progression of the users' know how, from the moment of the universal command's discovery to the phase where the user uses it reflexively and at maximum speed for the kinetic capacities of their hand and the tables of objects in memory by moving through the updating of these tables according to the development of the users' needs, structuring of the most varied objects that can be activated in the shape of strips and tables that can be represented in a symbolic manner and common to the different modes of use of the DED, creation of an easy manuscript writing to be interpreted by electronic means, in real time or off-line, which supplements the DED and expands its advantages for a user, voluntarily redundant integration in an unequalled form of the keyboard, mouse and command functions under a single hand which remains nearly immobile and does not need repositioning or any delay to move from one mode to another of Interfacing between the Human and the Machine, the capacity to replace the think/see/point/select/click type HMI like the mouse and the menu and scrollbar environments in the operation and designation of objects, exploring content and activation with a think/see/click type HMI then think/click, infinitely faster, the possibility of implementing a significant part of this method on existing devices by simple software installation, and the possibility of giving a high performance authentication and identification function to a personal object without being constraining for any user relation with third-party devices and systems.

For this purpose, we provide in a general way, a combinatorial data entry method on a data entry device (DED) including sensitive means which can be activated by the intermediary of at least one actuator allowing, according to the combination of sensitive means activated, an ad hoc computer program to designate and activate an object contained in an active correspondence table in memory, where the sensitive means are made up by at least three main detection zones Zi each made up of Fi (Fi=1, 2, 3 . . . ) distinct sensitive zones, the method including at least one step of designating/selecting an object from the active table and a subsequent step of validating and production of the designated object wherein for at least a first part of the objects from the active table, the step of designations/selection of a single object can equally well be done by the designation of the object in successive combinatorial mode or by the designation of the object in simultaneous combinatorial mode.

Subsequently, designation of a box or object in the active table for the production of this object will be discussed. This designation requires "production" of the combination associated with this box/object. It involves activation of a physical or logical zone. Activation of a physical zone includes the action of the actuator on this physical zone. The logical zone is an abstract zone associated with the physical zone from a computer perspective. Activation of this logical zone is consecutive to activation or deactivation of a physical zone which is linked to it. However, this activation is not necessarily synchronized to activation of the physical zone, in particular, where it relates, for example, to the confirmation of a combination when a user attempts to simultaneously raise the actuators on the physical zones, but where there is a very short time between raising the actuators on two distinct zones. Thus, a clearing time delay associated with each logical zone is introduced which is triggered when the actuator of the associated physical zone is raised. The logical zone will be deactivated at the expiration of this time delay. Thereby, at the time of the validation event, the logical zones which are still active, meaning those for which the clearing time delay has not expired, will be considered.

According to various examples:
  The method further includes a step of symbolic visual presentation of information indicative of the manner of designating the sensitive zones corresponding to the combination associated with each box of the active table, where the symbolic presentations can themselves be sensitive according to the technology of virtual keyboards.
  The method includes between the step of designation and the step of confirmation, a step of exploration and adjustments of the combinations which can be designated.
  The exploration step includes a visual, audio or tactile symbolic presentation step and puts in visual, audio or tactile emphasis the activated or deactivated sensitive zones in step with the user's interaction with them and objects associated with combinations sharing the sensitive zones already designated until the stage when there is no more than one combination associated to a box from the active table and to the object that it contains.
  The exploration step includes:
    a presentation step on the visualization means linked to the DED, of the different sensitive zones and for each sensitive zone, and of the objects whose production requires activation of this sensitive zone in addition to already selected sensitive zones,
    when the user selects a new sensitive zone or releases a sensitive zone, a time delayed step of updating the presentation of the selected sensitive zones and objects associated with the combinations of sensitive zones for consideration of all the sensitive zones designated at that instant or which were designated in the past interval less than one or more time delays, and of the objects which could still be produced.
  On a specific device including two distinct sensitive zones for each of the three main zones, the designation in successive mode of an object from the active table includes the successive activation of at least two sensitive zones among the six zones.
  For at least the second part of the objects from the active table, the step of designation/selection of an object is solely done by designation of the combination in successive mode.
  For at least one sub-part of the second part of the objects, the step of designation/selection of an object is done by a single press-raise on a single sensitive zone.
  The confirmation step includes detection of the deselection of all the main sensitive zones, where the confirmed combination is that made up by the sensitive zones which were still selected until an interval had past, this interval being:
    For the combinations outside pure Bitap successive mode, equal to a first clearing time delay (tempo2), and
    For the combinations in pure Bitap successive mode, equal to a second clearing time delay (tempo0) greater than the first time delay to allow a comfortable movement of the single actuator from the first sensitive zone to the second
  On a specific device additionally including at least one additional main detection zone made up of a plurality of logical zones and a plurality of tables among which the active table is located, wherein it additionally includes a step of substitution of the active table with one of the plurality of tables by activating at least one of logical zones from the at least one additional main zone
  The method further includes a correction, disambiguation, and prediction step for the chains of designated or validated object, where the step allows the creation of a table of suggestions including at least one suggestion, and a step of visual, audio or tactile presentation of the table of suggestions from which the objects can be designated, explored and validated by the description/selection step
  the designated, validated and produced objects are chosen among the set of computer and electronic objects, for example, one or several alphanumeric characters, a standard phrase, an image, an icon, a scrolling menu item, a command and computer program internal to said device, a command and computer program external to said device and residing on any other computer or electronic equipment to which the DED device is connected.

We also provide a data entry device (DED) including sensitive means that can be activated through at least one actuator, making it possible, according to the combination of sensitive means activated, for an ad hoc computer program to designate and activate one object contained in a box from an active table in memory, where the sensitive means are made up of at least three main detection zones Zi each one made usp of Fi (Fi=1, 2, 3 . . . ) distinct logical zones, for the implementation of the method according to any one of the preceding claims, wherein it additionally includes software and memory means, where the memory means store at least one active table and computer code and the software means execute the computer code and are suited to process the activation information from the sensitive zones in an undistinguished pure Bitap successive mode, successive or simultaneous and to produce the object designated during the validation of the combination of sensitive zones activated.

According to various aspects:

The device additionally includes means for movement detection which guide at least one electronic pointer, where the movement detection means are at least one from among the group made up of all or part of the sensitive detection zones, means adjoining the main zones Zi and means carrying the detection zones The device additionally includes, at least one additional main detection zone made up of a plurality of logical zones and a plurality of tables among which the active table is selected, where the at least one additional principle zone is suited through software means, when at least one of the logical zones is designated, to substitute said active table by one of said plurality of tables The device includes electronic chip type authentication means for the DED specific to the device, where the chip is suited to produce an alphanumeric string as a function of the usage profile in use on the device by the user and the character string entered by the user through sensitive means which can be activated for production of objects from the device.

The logical sensitive zones Fi from a single main zone Zi are mutually exclusive.

We also provide a data entry system including at least one data entry device DED as previously presented and computer equipment, the DEDs concurrently piloting the computer equipment to which they are connected, through the objects produced by them.

The system may additionally include means for visual, audio or tactile presentation making it possible to symbolically represent the active table, the selected logical sensitive zones and those yet to be designated for the activation of at least one of the elements from the table.

We also provide a computer Program intended to implement the method which includes a plurality of instructions suited to process the information for designation/deselection of the logical zones and produce an object as a function of the designated logical zones in successive or simultaneous combinatorial mode when the user validates the selection.

Example 1

Figure 1:
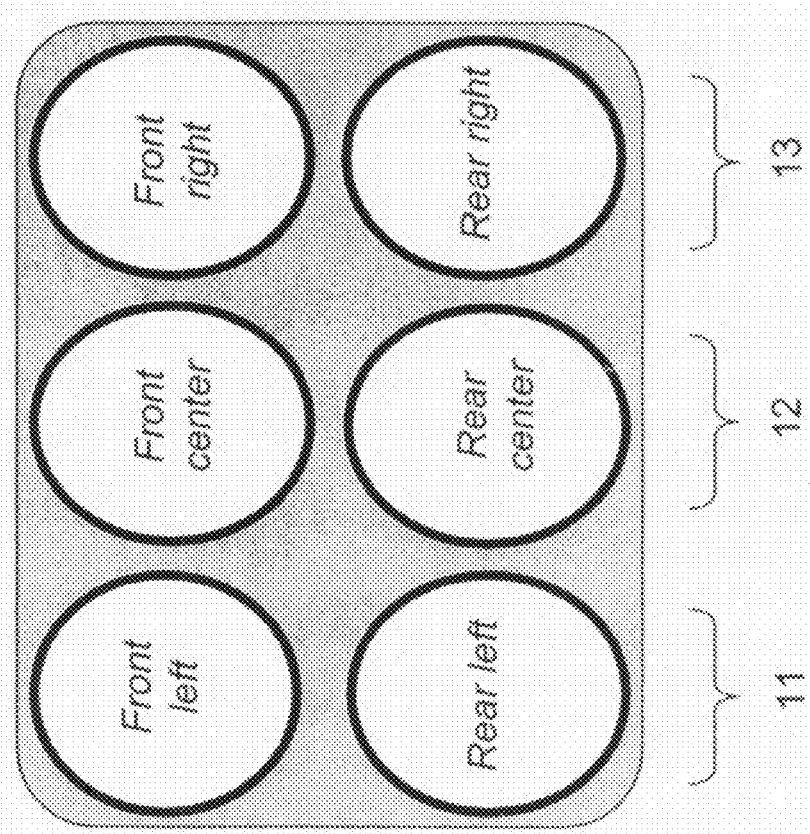
Figure 24A:
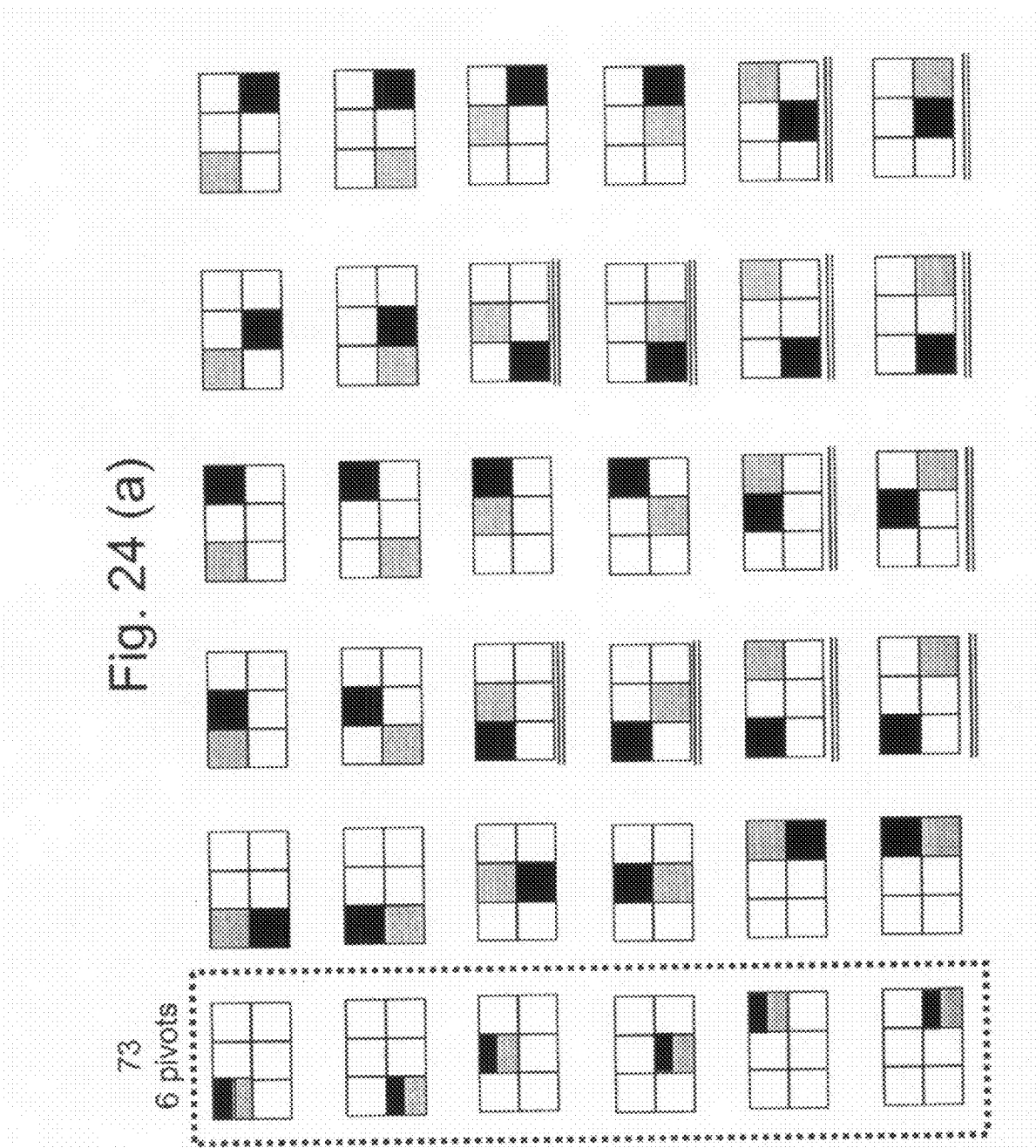

FIG. 1 shows a device according to which the combinatorial data entry device, hereafter called the DED, has three main adjacent detection zones (11, 12 and 13) associated with three "nimble" fingers (index, middle and ring). The zones are arranged to correspond morphologically to the fingers and each includes two adjacent sensitive zones (upper or "front" and lower or "rear" zone), often and in particular in expert mode, only one at a time is logically activated by the corresponding nimble finger, for example by software processing or hardware construction. As illustrated in FIGS. 24(c), 24(d) and 25(b), that might not suit beginners. This aspect makes it possible to get the most benefit from the kinetic possibilities of the hand and the brain which commands and controls them because the movements requested from fingers only are simple and have a large tolerance range. Additionally, the tactile sensations in the fingertips and kinesthetic sensations in the fingers themselves associated with the positions are simple and clearly distinct for human hand and brain. It is understood that this aspect is not limiting and that an implementation in which the number of logical sensitive zones is variable from one principle zone to another is also conceivable.

Each of these zones is comparable to a "logical" zone with which a state is associated. For each principal zone, three states are possible: upper or front zone activated, lower or rear zone activated and no zone activated (state equivalent to "finger raised"). In general, N logical zones of detection make it possible to use N+1 different states, even if other possibilities are conceivable, in particular, for avoiding ambiguities between different logical zones and creating redundant information between the zone which is deactivated and that which is active during this transition period.

For example, if the detection of a zone's activation is done by acoustic impact detection, it is necessary to be able to detect deactivation of the zone, meaning the entry into the not activated state of any of the N sensitive zones. In the opposite direction, a solution could be to not consider the N+1st state and only use the N states associated with N sensitive zones.

According to another example, Example 1 would be done with three zones such that the users would not have to raise their fingers, therefore with the same number of useful states, three, which would allow them, by sliding or pressing vertically more or less deeply (like a trumpet valve), to continue to hold the DED or the object, for example a telephone, handlebars, or joystick, all while designating and validating the sensitive zones of the desired combinations.

The action of all or part of the three nimble fingers on the device's sensitive zones produces a combination of activated logical zones to which is associated a computer object, for example an alphanumeric character.

Variety of Actuators

Use of the fingers as principal actuators of the sensitive zones of the DED is a solution. However, any type of actuator could be used and even mixed together to designate different logical zones: stylus, pen, ends of limbs, mobile body parts, including devices for tracking eyes and eyelids (for the handicapped), head, fingers, from one to three in the context of the first embodiment, electronic pointer of any kind, etc. In what follows, different terms designating an actuator are used without that in itself restricting the description of our technology.

It simply has to be recalled that according to the number of available actuators the mode of designation could be successive, sliding, simultaneous or mixed, therefore faster or slower, and requiring more or less attention, but always making it possible to designate a given box in a reference table which can be represented symbolically, in particular on the screen.

Precision on the Combinations

In every case, and in particular for the structure from FIG. 1, the word combination must be understood broadly and include either Arrangements (considering the order of designation/activation), or Combinations in the mathematical sense (not considering the order of designation/activation), or a "mixed" combination of the two. This enlargement of the conventional concept of "chording keyboards," until now nearly exclusively combinatorial in the mathematical sense, has the objective of making possible the use of a single given device, like that from Example 1, with a number of fingers or actuators or handled by them, variable from one to five, to take into consideration the different contexts where the user finds himself and his preferences. For that, the device rests on a canonical arrangement, according to the features of the human hand with five fingers, in tables common to all contexts, which contain "boxes" whose single content is designated and then confirmed according to a process for "writing" its "address" in the table which is adapted to the context, technologies with which the DED is implemented, number of movable actuators, and to the user's preferences. To consider the constraints examined below, a small number of boxes might not be accessible for all the processes and their contents might possibly be duplicated in other boxes from the canonical arrangement. Alternatively, other combinations relying on the non-exclusivity between the sensitive zones of a single main zone could be added to the modes which only access a smaller number of combinations. Alternatively, for technologies which do not allow the multi-touch of two sensitive zones, one additional zone could be added to allow the equivalent of the simultaneous pressing of two sensitive zones normally mutually exclusive.

Simultaneous Combinatorial Mode and Successive Mode

As it relates to the mathematical combinations possible with a type 1 implementation, each finger can take three states which mathematically corresponds to 27 combinations and makes it possible as described in FR85/11532 to address an alphabet of 26 signs. FIG. 5 illustrates, according to a strip presentation, an example of association between the 26 possible useful combinations according to the device from FIG. 1 and the characters of the Latin alphabet. In the example from FIG. 5, the strip makes each of the letters of the alphabet correspond to a representation, in the form of a checkerboard, of the combination to make on the device to produce a letter (the black boxes are those which were designated by the user's fingers). For example, if the three nimble fingers each activate the upper or forward sensitive zone of their detection zone, then the device, for the strip from FIG. 5, presents a "Y" which will be activated when the fingers leave the three upper sensitive zones together. It is a generalized feature of the state of the art of chording systems to principally validate a combination only after raising the last finger involved, unlike conventional keyboards which are triggered when pressed. Ad hoc software makes it possible to interpret the combination provided for activating the corresponding object. The software can, for example, retrieve the identifier of the activated zones and, with the help of an active correspondence table such as illustrated by FIG. 5, produce the character determined by the combination of these identifiers.

But the same device from FIG. 1 can easily address 36 different logical addresses if the user chooses the successive "Bitap" mode for designating two sensitive zones among the six. FIG. 6 gives a representation of these 36 "combinations," which are arrangements in the mathematical sense, two out of six. In this representation, it can be seen which is the first (white square) sensitive zone to be activated and deactivated, and the second (black square), whose lifting will validate the "combination."

Below we describe the continuum of processes, going from the simplest to implement with sensitive zones made with conventional keys designated, activated and released successively by a single finger, to the most detailed mixing arrangements and combinations produced by three fingers acting on the DED according to a type 1 implementation with a "multi-touch" technology making possible a mixture (mix) of successive, simultaneous and sliding actions. Doing that, we will examine the different variants associated with different compromises in matters of number of combinations, ease, rapidity, size, etc.

Process According to the Successive Mode

One of the interests of the successive mode is it can easily be implemented with a single actuator, which is often practical, in particular, for the DED which will be implemented on mobile objects preferentially handled by a single hand (telephone, multimedia players, etc.) or when the other hand is occupied or when there is no support to hold the DED or when it is made in a technology which does not allow simultaneous pressing (current touch screens, virtual zones), as described below in the paragraph "technologies". The successive mode with a single actuator also allows action with a stylus, which is also a pointing device, and the remote action on sensitive zones or their symbolic representations with a simple pointer.

The base variant of the successive mode is the "Bitap" process already described above.

A first aspect, particularly interesting because it is fairly natural and applicable with a large variety of actuators consists of sliding it on a touchpad or touch screen type surface. In this variant of the successive mode called "Slide," a single actuator descends on the zone and then slides towards another zone while potentially passing by one or two others and then is raised, which validates the arrangement. The slide mode can be used with a stylus or finger on a touch screen, a pointer on virtual zones, for example, the representations themselves of sensitive zones on the screen, or finger such as the thumb on the zone capable of following its movement like a touchpad (company's name), standard according to the state-of-the-art, or a touch screen. The combination built up can be the association of the first and last zones or the association of all the zones described by the slide. When this "Slide" is done with a stylus, it approaches a cursive writing. Farther on it will be seen that this cursive writing can be done without a sensitive zone, with paper and pen or pencil, or on a sensitive screen tablet, in a very small surface, for example the size of a large cursor, which thus approaches manuscript writing recognition systems but with a simplified writing therefore easily recognizable.

A second advantageous aspect for the speed of the successive mode, called "Successitap", consists, when the user can mobilize two fingers, for example both thumbs, to relieve the user of raising the first finger before activating, with a second finger, the second zone, if it is different from the first, and then raising both fingers together which represents a simultaneous validation analogous to that of the combination mode. This first variant, which leaves the user the choice of using one or two fingers, or three, thus realizes a first example of mixed mode. The six arrangements, which are confirmed by two successive press-raises of a single finger on only one zone, remain validated with this manner. There are still 36 "combinations."

A third successive and "Successitap" aspect favors the use of three nimble fingers positioned above the DED, each taking care of two sensitive zones, front and rear, the hand remaining still. This aspect, by removing the movements of one or both fingers between the columns of the DED, and allowing the parallel action of the fingers, improves the speed. The slight problem involves the six arrangements on a single zone, which requires nearly unnecessarily two successive presses. If it is desirable to make only one press, then the six arrangements normally produced by one finger by going successively from one of its two zones to the other are no longer feasible. When the technology allows it, a solution consists of allowing a single finger to activate its two successive main exclusive sensitive zones successively but without being raised. This can be done with touchpad or touch screens type technologies, by a slide, or with keys by a rocking/sliding of the finger. In practice this problem is more important when mixing simultaneous chording with Successitap is desired, because, in successive, making two successive press-releases on a single zone is not very penalizing. Another manner, which favors speed and only loses three combinations, allows simultaneous pressing with one finger on two sensitive zones, principally exclusive, which contributes three "combinations" (unordered) to the 6*4+6=30 arrangements of the initial Successitap mode where a single press-raise for the combinations with a single finger on the same zone is desired, and makes it "mixed". To compensate for the three combinations still missing in quick Successitap compared to Bitap, the addition of three finger combinations could be allowed, for example the two "simple" combinations of three fingers forward and three fingers rear, or the three combinations which simultaneously press the four front and rear zones of two columns by two fingers or even a single finger when the two columns are contiguous and a fourth by pressing the six zones simultaneously. These solutions are only possible with certain technologies, either conventional keys with low depressing force and suitably shaped, inclined and spaced surfaces, or touchpad or touch screen zones allowing multi-touch, which is still not frequent. Although the ambiguities and risks of errors are still low, it is advantageous to accentuate the differentiation between Successitap and simultaneous combinations by the definition of a time delay threshold (tempo1) which delimits the Simultaneous designation (unordered and therefore short) from the Successive designation (in an order, and therefore a little slower). A typical value for an average skill at pressing the fingers simultaneously is 20 ms for tempo1.

A fourth aspect of the successive mode called "Tritap", adds a third finger without being concerned about its nature or position (index, middle or ring) and only considering the fact that it activates a "front" or "rear" sensitive zone to make it play in some ways the role of a band rotation actuator (functionality described later in connection with implementation 2), which thus makes it possible to access 3×36 or 3×33, or 3×30 combinations depending on whether the user selected Bitap or one of the different Successitap variants which only use two fingers for a combination.

As if the third zone activated corresponded to a substitution command for the active band of 36 (33 or 30) in use for a second of 36 (33 or 30) when the third press is done in "forward" or upper position, and a third of 36 (33 or 30) when the third press is done in "rear" or lower position.

Process Based on Simultaneous Mode

The designation and validation mode which is the quickest, but requires the most actuators is the one which can be called "Simultaneous" in which the order of designation of the sensitive zones is not considered and validation is done upon noting that the main zones managed by the three nimble fingers are physically deactivated and only considering the zones which were still activated at the time of validation less a certain time delay (tempo2). This rear time delay device takes into account that raising the fingers is not absolutely simultaneous and avoid that any zone which was activated and then deactivated since the previous validation could be taken into account, as is seen on most chording keyboards (like CyKey). At each raising off a physical zone, the tempo2 is triggered and at its expiration the associated logical zone is in turn deactivated. This tempo2 works as a clearing time delay for zones activated and then deactivated, for example, during an exploration or trial and error. It cannot be reduced to zero because, in this case, zones sought by the user would be seen as not making up part of the validated combination. A typical value for an average skill at raising the fingers simultaneously is 50 ms for tempo2. Also it cannot be too large because the clearing would be too slow, which would impede exploration, important functionality for guiding, described later. Not considering the order of activation of the zones makes the action of the fingers easier, in particular, the transitions between combinations but only allows 26 useful combinations on six zones and requires three fingers for eight of them. When the event triggering the validation of the activated combination arrives (for example no more physical zones activated), the object produced is the one corresponding to the combination whose logical zones are still active, meaning whose clearing time delay tempo2 is not yet expired.

A manner of not having to add a third finger and to do simultaneous with sufficient combinations is possible when entering text with significant words in a given language. The principle is called "disambiguation" and was made famous by the T9 technique from Tegic. It consists of not asking the user to produce exact letters but being satisfied to produce a code associated with two (Suretype) or three/four (T9 or iTap) or six letters (Tengo) and let the software and its vocabulary tables remove the ambiguities by suggesting syllables or words that the user only needs to choose instead of typing them, which is not always advantageous with the existing systems. In our devices, if two keys are tapped simultaneously, each of the 18 possible combinations can only correspond to two distinct arrangements by the typing order of the two single keys correspond to a low ambiguity, and are easy to deal with. A root or a single word will very often be the only possibility. In the case of several choices, the fact that with the chording keyboards one does not look at the keyboard, makes it possible to only look at the screen and, therefore, to see immediately the system messages, and then with a dynamic guiding system associated with the interactive presentation (described below), to present the choices in a manner to select them with a combination linked to the position of the choice in the dynamic guiding, therefore, without having to activate the movement and confirmation keys: one sees and clicks, producing the implicit combination which is then faster than finishing typing the word. Therefore, when disambiguation software is available for the language in which a text is being created, one can simultaneously and very easily press with two fingers, thereby resulting in rapid and natural use for a user having started in "Bitap" and then "Successitap". An interesting aspect then includes using the free third finger to do Tritap where the first two fingers act simultaneously and the third successively.

A second "Mixed" mode includes mixing the Successitap mode and the Simultaneous mode to have access at the same time to 30 combinations and for 26 of them to benefit from the speed of Simultaneous or comfort of one or two fingers only (6+12 simultaneous combinations only, and respect the activation order for the eight combinations which would otherwise requires three fingers and the four arrangements of two fingers for which there is no correspondence possible in the 26 combination band). This mode is illustrated by FIG. 7. In this second quick mixed mode, the combinations with a single finger on a single zone, column 73 of FIG. 7, have to be done with a single press-raise, which only leaves 30 accessible boxes out of 36 from the "Bitap" reference. The six combinations corresponding to column 77 of FIG. 7 are not possible. The first three possible additional combinations, already mentioned above, are those which can be produced by pressing simultaneously, when the technologies support it, with a single actuator finger, on two sensitive zones of a single main zone FIGS. 24(c), 24(d) and 25(b), column 77. To compensate for the three combinations still missing in this second quick mixed mode, compared to "Bitap" for reference, the addition of three combinations calling for pressing simultaneously the four "forward" and "rear" zones of two main zones (columns in the implementation from FIG. 1) by two fingers (or even a single when the two columns are contiguous) and a fourth pressing simultaneously on six zones, 24(c), 24(d) and 25(b), column 77. These solutions are only possible with certain technologies, either conventional keys with low depressing force and suitably shaped, inclined and spaced surfaces, or touchpad or touch screen zones allowing multi-touch, which is still not frequent. From the perspective of manipulations, these "abnormal" combinations are a little less easy to do well without error and are, therefore, done more slowly. It is, therefore, fairly legitimate to assign to these boxes which are slower to "address" a content which is called less often, and from concern for upward and downward compatibility according to the number of available fingers, these contents will logically be arranged in the six boxes corresponding to the six "successive" arrangements produced by an actuator going from "front" to "rear" or from "rear" to "front" of the same principle zone (column in the implementation from FIG. 1), combinations illustrated in column 77 of FIG. 7. In this second mixed mode with an objective of speed, the risks of errors are significant between simultaneous presses and successive presses in the two opposite orders, it is, therefore, imperative to provide the definition of a time delay threshold (tempo1) which makes it possible to delimit the Simultaneous designation (unordered and, therefore, short) from the Successive designation (in an order and, therefore, a little slower). An order of magnitude of 20 ms allows the average user to produce proper simultaneous combinations without imposing on them too long a delay for the successive combinations to be correctly seen as such.

Third Preferred Mixed Process

Figure 25:
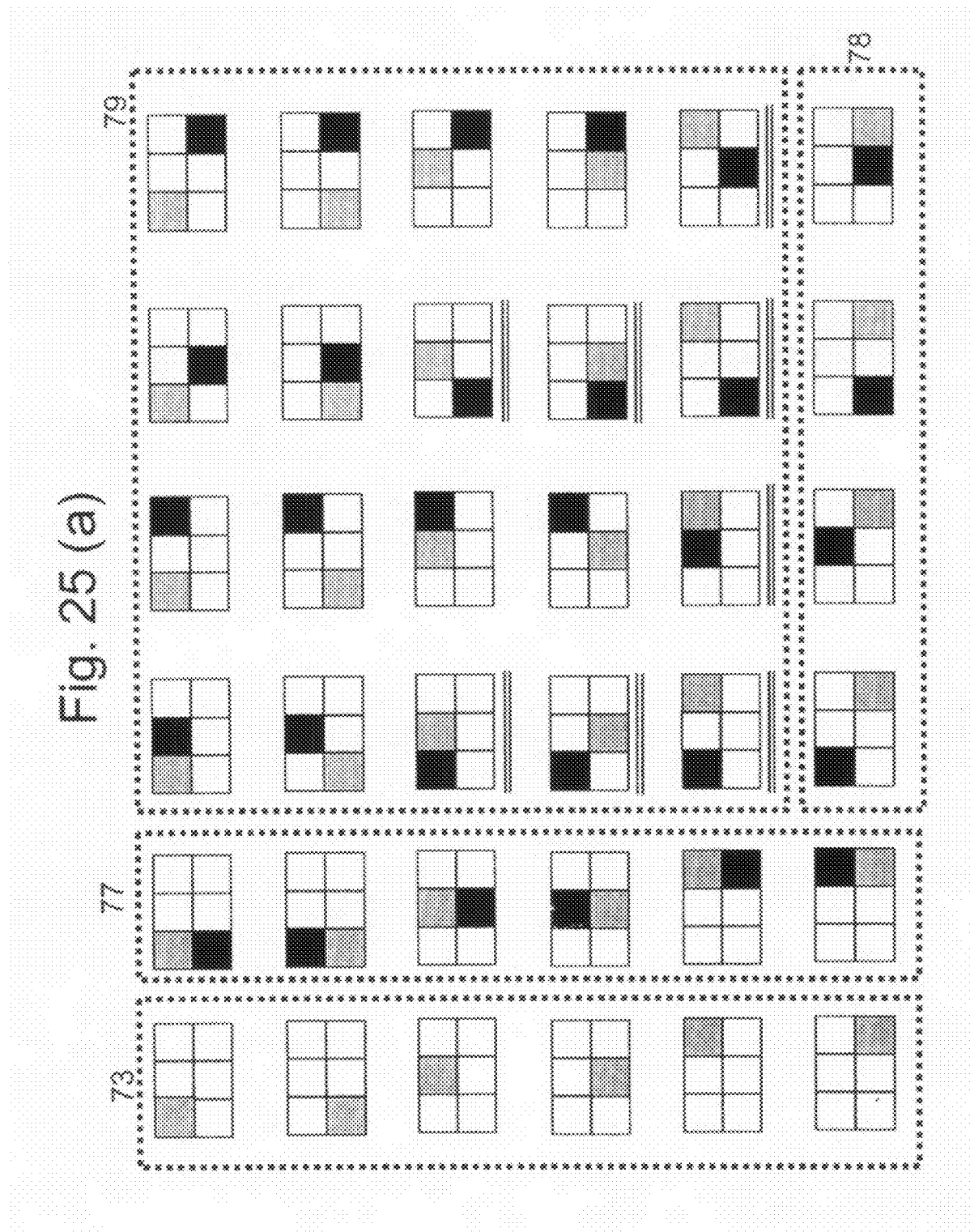
FIGS. 25a and 25b represent an alternative to the modes of FIGS. 24a to 24d.
Figure 25:
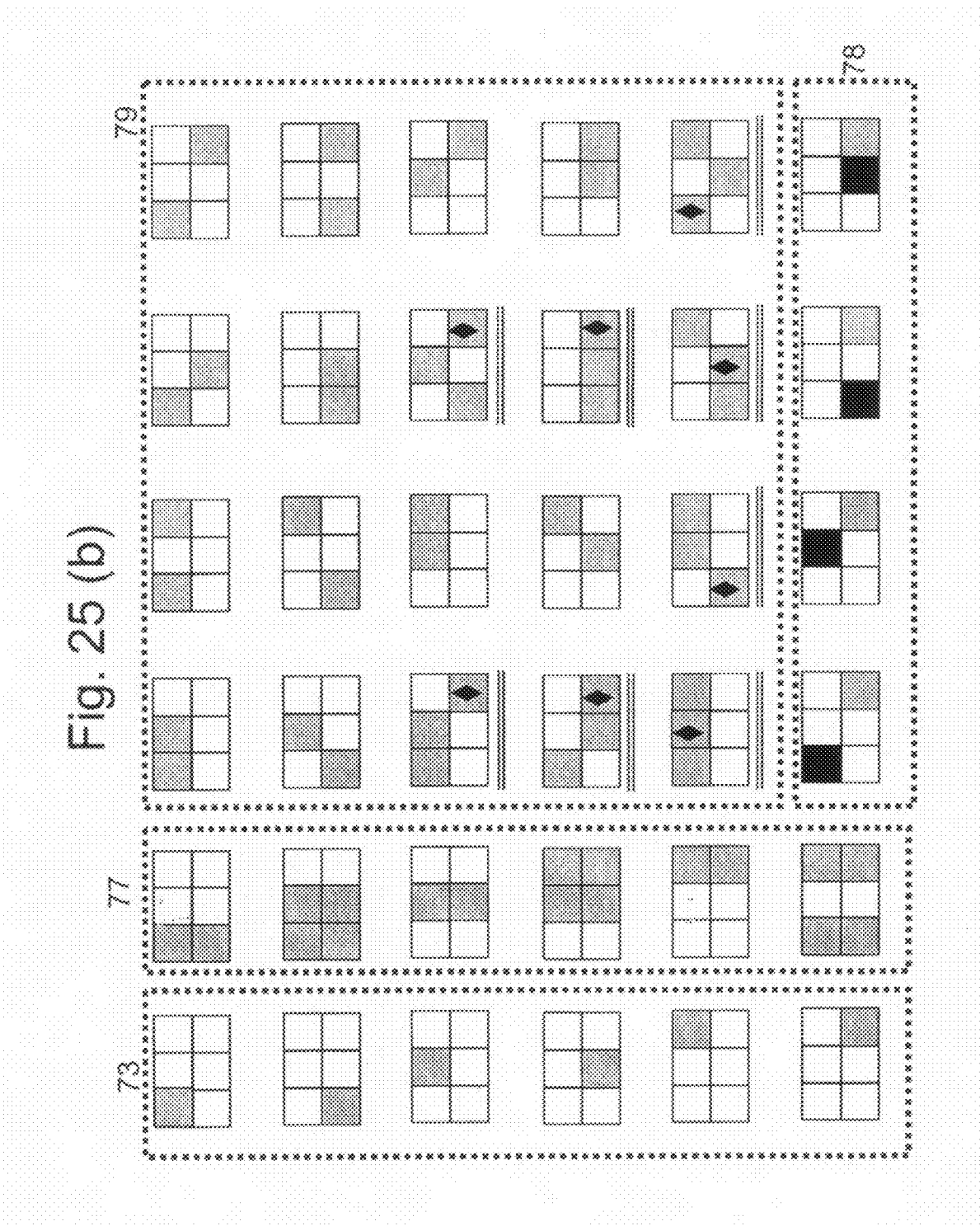

A third particularly interesting mixed mode includes making the modes "Bitap", "Successitap" and "Simultaneous" ("Simultap") simultaneously possible under the sole constraint that the six specific combinations from the "Simultaneous" mode which are normally done by a single press-raise, called "pivot combinations", column 73 in FIG. 7 and in FIG. 25, be produced by a double press-raise, as in the "Bitap" process. The advantage of this mixed mode is that the same DED with the same configuration can be used with one to three digits or actuators, FIG. 24, column 73. It does not involve, as in the "Tritap" process or the "Advanced" process described below increasing the number of different combinations, but of making the production of the same 36 combinations possible in the broad sense of a "Bitap" strip, by different processes, according to the number of available fingers.

In reference to FIGS. 24a to 24d, the mixed mode makes several production modes cohabit: the mode (a) simple for the beginner, the mode (b) intermediate, the mode (c) confirmed and the mode (d) expert.

The simple beginner mode (a) offers 36 combinations, all of which can be activated by the Bitap successive mode.

Mode (b) is similar to that described for FIG. 6, making it possible to join the Bitap and Successitap modes: where the light box is the first zone activated, and the dark is the second beyond the simultaneity time (tempo1). It should be noted that the 8 Bitap combinations (underlined twice in the figures) which have a concurrent antecedent, but which can easily be differentiated from these concurrents by the addition of a third box which leads to the designation Simultap for the combination. To disambiguate certain near successive combinations, for example, a1 and a2, the user can use a third zone for disambiguation (box with an lozenge) which makes it possible to validate the activated combination.

Confirmed (c) mode keeps the Bitap mode for the six "pivot" combinations. Through the third disambiguation key, a large number of combinations can now be activated simultaneously (two or three light boxes), where the validation of the combination is done by simultaneous raising of all the boxes. Since that results in a significant reduction of time in production, these combinations are chosen for the most frequently produced objects. Four combinations can only be activated by two zones selected solely in successive mode, FIGS. 24(d) and 25(b), part 78, therefore with an explicit order to differentiate them from the simultaneous combinations selected by the same pairs of sensitive zones. Finally, the six combinations 77 "front"-"rear" are activated simultaneously for three of them and the three other combinations are activated by keeping a pressing order, which makes it possible to disambiguate from the three other combinations 77.

The expert mode (d) accelerates the production of objects relative to the mode (c) by no longer requiring the adherence to an order for these three combinations by authorizing a simultaneous press of four adjacent zones to provide the immediate disambiguation needed.

These four modes coexist in the device to allow the beginner and expert to use the same device. This cohabitation is essentially due to the presence of the simultaneity time delay. Since the beginner is not as fast, their activation of two logical zones is naturally greater than this time delay. It, therefore, uses the beginner mode essentially based on Bitap (a single actuator) or Successitap (at least two actuators). As for the expert, they produce sufficiently rapidly to be able to activate two zones in the lapse of time below the simultaneity time delay: they can, therefore, prefer the use of the expert mode essentially based on the Simultap mode.

The aspects illustrated by FIGS. 25a and 25b which are different from the preceding in that the pure successive Bitap mode for the six pivot combinations is eliminated in favor of a designation by a single press-release action.

In the beginner mode 25a (equivalent to mode 24a), the combinations other than the pivot can be designated by successive action of the two zones. It involves a common Successitap.

The expert mode (25b) provides a maximum of simultaneously producible combinations and, therefore, offers increased performance: the six pivot combinations can be activated by a single zone press-release action.

It should be noted that an intermediate mode can be put in place by bringing together the designations of the mode illustrated by FIG. 24c among which the designation of the pivot combinations is no longer done except by a single press-raise.

In the first aspect brought up (FIG. 24), the designation is done by two presses minimum and the first part of the active table composed of 20+6=26 addressable objects (77+79, FIG. 24d) both in pure Bitap and in held successive and simultaneous. It should be noted that the 79 combinations, unlike the 77 combinations, are addressable with the help of devices for which the sensitive zones of the single main zone can be exclusive.

In the second aspect (FIG. 25), the designation is done by 1, 2, 3 or 4 presses and only according to the held Successitap and Simultaneous mode, since the 26 objects (77+79) from the first part of the active table are made in the same way in both aspects. The difference between these aspects concerns the six pivot cases which in the second aspect are done by a single press-raise on a single sensitive zone bringing to 32 the number of boxes that can be addressed without having to respect an order.

Concerning the designations corresponding to two boxes with the same finger, they can only be done with a technology allowing sliding or keys curved towards their separation to do a sort of slide from the first to the second without lifting.

Advanced Processes

Figure 8:
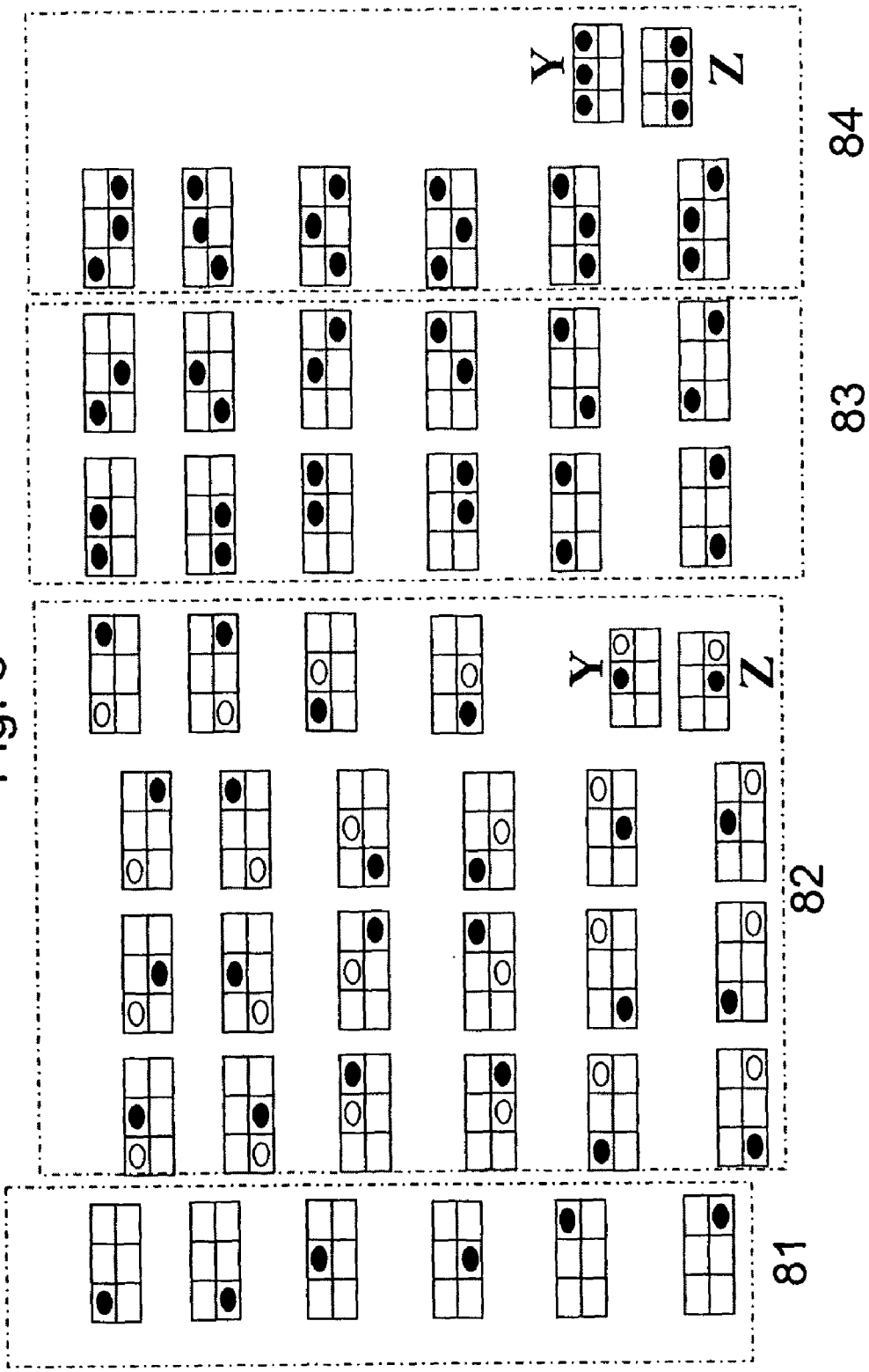

In an "Advanced" process illustrated in FIG. 8 for adept users, the designation mode combines the Simultaneous (81, 83 and 84) and Successive (82) combinations. As above, the definition of a time delay threshold (tempo1) makes it possible to delimit the Simultaneous designation (unordered and therefore short) from the Successive designation (according to an order, therefore a little slower), bringing by the same the number of possible combinations to six one-finger arrangements/combinations+24 two-finger Successitap arrangements+20 simultaneous two- and three-finger combinations, for a total of 50 combinations. The choice between "Tritap" and this "Advanced" mode, for increasing the number of combinations accessible in a single cycle of designation-confirmation for an implementation according to FIG. 1, will come from the user depending on their preferences and skills, and must also be compared with implementation 2 type solutions described below, which bring into play in addition to three nimble fingers on the type 1 implementation, the thumb on a fourth main zone having up to five sensitive zones (multiplying the choices by six, for example 6×27−1=161 combinations accessible in a single cycle) and the little finger on the fifth main zone having two sensitive zones (multiplication by three, or for example 3×6×27−1=486 combinations accessible in a single cycle).

In a "very Advanced" mode designations and validations by "Slide" are added to benefit from the fact that some of these movements are natural, although slow, and can be associated by mimicking typical commands like "open" or "advance". Technically this consists of adding to the table editor already mentioned, a capacity for recording these "Slides" and making them correspond with a box from these tables where the object desired for this recorded action will be placed.

Specific Validations

In general, a combination is validated upon raising, either the last finger (Bitap, Slide) or the different fingers making up the combination (Successitap and Simultaneous). So long as a nimble finger is applied, there is no validation, which makes it possible to correct a combination before producing it erroneously and with the clearing time delay, and screen presentation or other devices, as described below, exploring the contents of the active strips and tables (thereby emulating the search on a conventional or virtual keyboard and making it possible for the beginner and the expert to find an object that they have not yet consciously or reflexively memorized).

For the beginner, this process can be too sophisticated for their skill level. For certain confirmations of important objects, such as standard phrases presented by icons, it can be anticipated, in the relevant case, that the confirmation will not be done on raising, but after this raising, which brings up a confirmation window according to the state-of-the-art and will be confirmed by responding "yes" or canceled by responding "no". In the case of "no", the DED returns to the prior state; in the case of "yes", the DED goes to the normal state after a validation.

In an "individual" mode, some boxes from the table could be validated upon raising only the second or third finger of the associated combination, which would make repetitions easier, according to a familiar movement, for example, for increasing or decreasing the volume, or turning pages. In this case, the immediate exploration described below will be lost for these boxes (it will remain valid by leaving the final finger of the combination raised beyond the time delay (tempo2) for clearing/exploration).

This individual mode corresponds to a general need for repetition of the combination. To avoid having to repeat the full combination or to make possible faster repetitions than the fingers could do, there are several possibilities for obtaining repetition, for a combination or a sequence of combinations, without losing the important capacity for exploration and correction before validation. Example 1: by a triggering on holding pressed similar to classic keyboards but only following the second successive designation of the same combination. Example 2: by the creation of an internal software function which would be placed in one particularly practical or logical box and whose designation and holding pressed would trigger the rapid repetition of the preceding combination (or of a succession like Alt+Tab, Ctrl+--> or Ctrl+Del); this repetition would stop on raising and restart on repressing.

Comparison of Process Capacities

Although it is not an obligation for the users, we allow the user's personal tables to be logically the same for the different designation and validation processes. This supposes an equal number of boxes addressable by arrangements or combinations or a mix of them.

For six sensitive zones, the successive mode gives access to 36 combinations (arrangements) (FIG. 6) and the simultaneous mode 26 combinations (FIGS. 5 and 7). FIG. 7, brings together 36 arrangements and 26 combinations, distinguishing them by distinct activation signs for the zones (clear or black point or square). It can be seen that the 36 arrangements are distributed between 12 arrangements (71, FIG. 6 or 7) made with one finger and 24 with two different fingers (72, FIG. 6 or 7) and that the 26 combinations includes six made with one finger (73), 12 made with two fingers (74) and eight made with three fingers (75 and 76).

A logical first solution for a user who wants to be able, depending on the context, to act with one, two or three actuators and keep the same tables of objects would be to abandon the six arrangements difficult to do in combination mode (77), add back a third finger (shown by a black square on the figure) to eight arrangements (75 and 76) to be able to cross from the successive tap while respecting in order and keeping or not the four arrangements (78) which would require still a precise order of successive action. With a mixed mode for designation and confirmation, the user could keep 30 "combinations" in all the cases using from one to three actuators and therefore to sustainably and memorably place objects there to be activated. There would also often be an advantage to placing objects which compensate the greatest slowness of the successive mode or the absence of main zones activated by the thumb or little finger (see implementation 2 below) in the boxes associated with combinations which are not accessible in the quickest mode which is the mixed2 mode (Successitap plus simultaneous), therefore requiring three distinct actuators. This first solution is fairly logical, but only allows having 30 common combinations between the three principal processes and their mixed variations.

A second solution, which is not possible with all the technologies, includes partially breaking the dominant choice of exclusivity between two sensitive zones from the same main zone. The seven combinations still fairly easy to produce can then be arranged and placed in correspondence with the six arrangements difficult to make in combination mode (77 from FIG. 7) by putting the same contents in them. This then makes it possible to manage a common reference strip containing 36 distinct objects.

Nature of the Objects

This disclosure is not limited to alphanumeric character type computer objects because it allows, for example, assigning a function of the device to be controlled, such as for example opening an application on a computer or turning off the TV set, to a particular combination of fingers.

Generally, a designated and confirmed object can be, without restriction: one or several alphanumeric characters, a standard phrase, an image, a computer icon, an item from a scrolling menu, an internal command for the operation of the DED itself, or guiding external equipment, a internal program on the device, or external residing on third-party computer or electronic equipment.

The interest of being able to designate any type of object lies in the possibility of controlling with the fingers of the nearly immobile hand everything which can be controlled on an equipment without using a dedicated device (keyboard and keyboard commands, and mouse for everything which is computer related, remote control for electronic equipment, etc.)

For that to be operational, it is clearly necessary to separate in the object, according to the state of the computer art, its symbolic representation (letter or word or icon), its executable content, its means of transmission and execution in a certain context and at least one possible explanatory label, analogous to that which can be displayed when one passes over a scrolling menu item or an icon from a graphical HMI.

The table containing the objects with their different components are naturally, according to the state-of-the-art, files, notably at the level of execution elements, which are exchangeable and adaptable to different contexts and devices which the user would like to use and control with the same visible elements from the personal tables.

All this, according to the state-of-the-art, would rely on table editors capable of collecting or entering the objects to be placed in the tables and adapting the elements to them.

Construction of Tables/Strips

The strips can contain objects of heterogeneous nature examples of which were previously provided. In some contexts, in particular in the computer domain, it is advantageous to have a device or software making it possible to record all the available computer objects (icons, commands, applications and the like) and organize them in the forms of strips and tables so that they can be presented, designated and activated by the device much more quickly than an electronic pointer, much more compact than a conventional keyboard, only much more powerfully than the devices of the small portable or personal electronic objects.

The representation of these objects can be the object itself (which is in particular the case for the alphanumeric characters) or, for example, an icon representing the object (an example is the icon from the Word toolbars allowing the execution of a specific command).

Technologies

Figure 21:
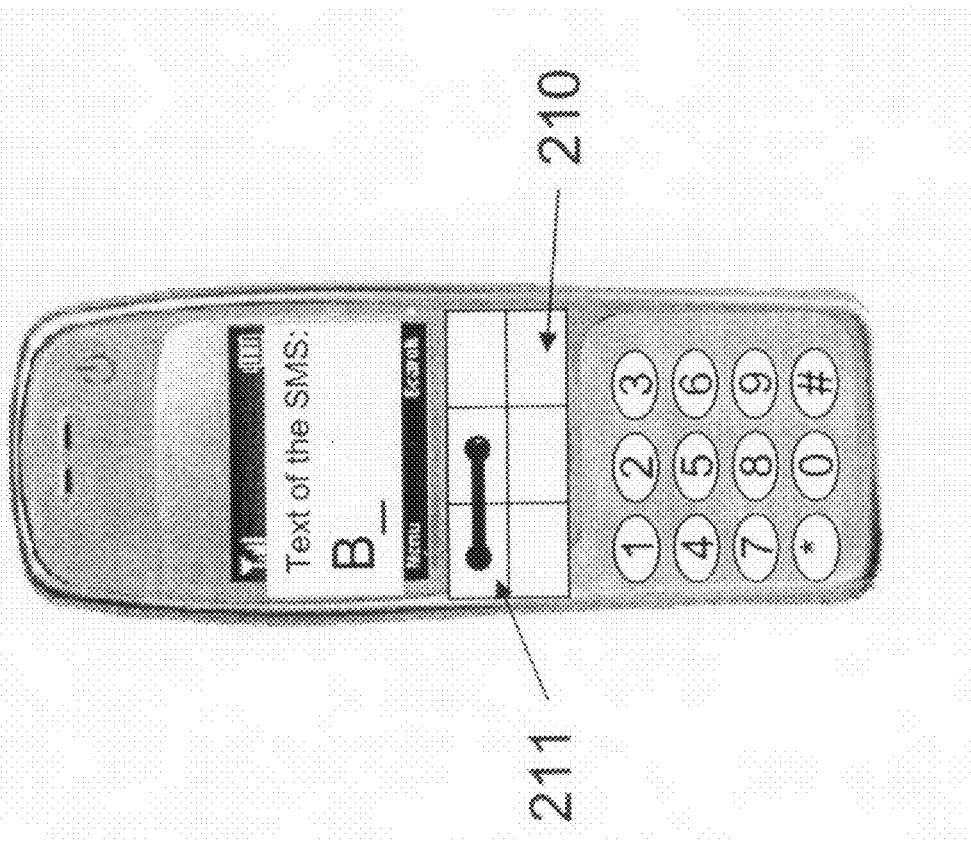
FIGS. 20, 21 and 22 illustrate different implementations of the DED on mobile telephones.
Figure 22:
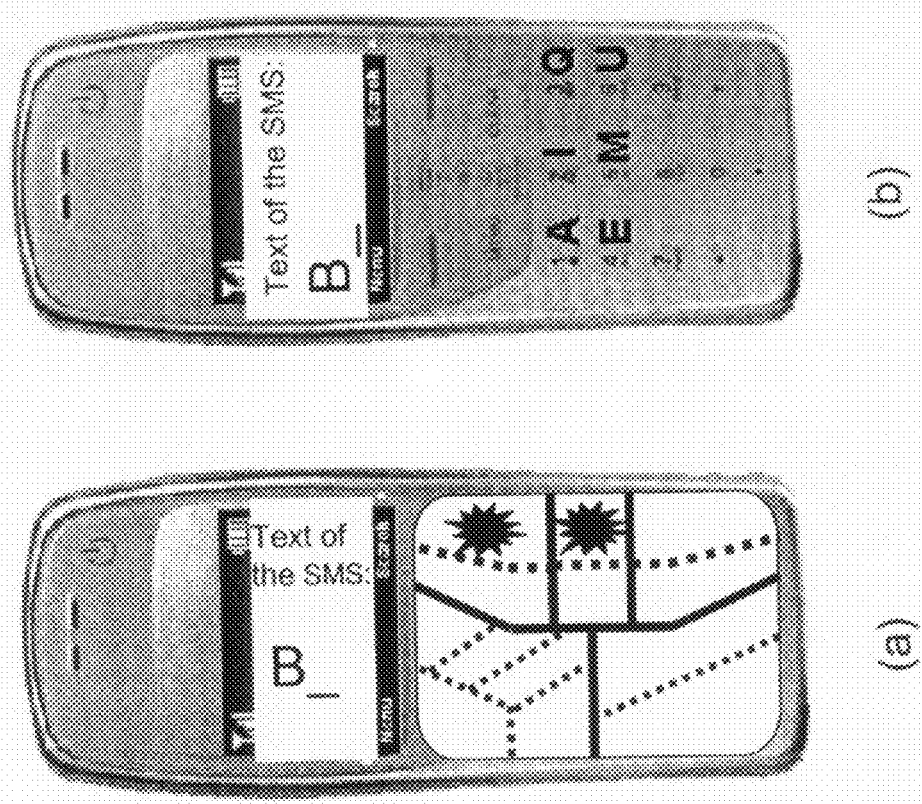

"Mouse" solutions are not suitable for a large part of the mobility solutions. In these cases, various technologies exist for implementing different detection zones and a pointer when there isn't a surface for setting down a mouse. Among others, note the technologies associated with capacitive or resistive sensors, of the Touchpad type (company's name), which make it possible on a single surface to create, for this implementation 1, three independent main zones ("multi-touch") and two logical sensitive zones in each of these zones. Management of the inter-zone boundaries can be performed by software which interprets the coordinates delivered by this sensor for activating the logical zones corresponding to different presses of the different fingers. Some sensors provide a set of coordinates corresponding to the extended zone of influence and application of the finger. In this case, software makes it possible to associate a significant point to the set of coordinates provided by the sensor (and therefore constituting the coordinates of fingers), or the upper (lower) point if the majority of the coordinates are in one of the upper or front (lower or rear) zones. The choice of the significant point must be made to maximize the discrimination of the actions of the actuator on the different logical detection zones. An advantage of the capacitive solutions resides in the thinness of the sensors allowing for their integration in systems such as portable phones (FIGS. 21 and 22). Resistive technologies make it possible to implement equivalent sensitive zones, where the differences mainly bear on the force necessary to activate the sensitive zone: non-null in resistive technology, which slows the designation and confirmation of objects, and null with capacitive technology, which could give rise to involuntary activations.

Many detection technologies can be considered: either the detection is done on and by the surface where the fingers are positioned and move, like capacitive or resistive touchpads, conventional keys, or on membranes, or sound of impact, or else the detection is done by sensors not integrated in the surface of stopping and rebounding of the fingers, where the surface might further not be necessary, such as light or radio detection (RFID technologies), different direct and indirect sensors of the angle of the phalanges integrated, for example, in electronic gloves (U.S. Pat. No. 5,194,862, or fiber optic technologies extending along each finger). The latter could be put to use by wearing the core of the finger-position detection-device in a bracelet at the wrist of the hand involved. FIG. 2 illustrates a bracelet (21) worn at the wrist. This bracelet is provided with means of detection (22) by waves (light, infrared or the like) of the features and positions of the user's fingers. The values of the distances $D_{finger}$ and angles $\alpha_{finger}$ make it possible, according to the parameters predefined by the user, to identify the zones of the virtual keyboard which are activated.

These latter solutions make it possible to detect the positions of the fingers stopping and rebounding on any surface, or completely leaving the rebound surface, although probably with slower speeds, and are particularly interesting, because the hand can write alone with all the fingers available without the other hand or a third support being necessary and while being in a situation of comfort and performance much greater than by holding the electronic object in the hand and having only a thumb for acting on the integrated DED.

Among the light detectors which can be high performance and economical, charge coupling CCD sensors (charge coupled device), CCD camera type, can be used, which are going to make it possible to delimit the volumes of space correspondent to the different zones brought up previously and create analyzable images of the presence and position of the different fingers. The user then places a finger, or a hand, in the volume corresponding to logical zone that they want to activate to designate a combination and activate a desired object.

Our devices also apply when the sensitive zones are created on the touch screen. Generally, these touch screens are not currently manufactured to accept a multiple press, ("multi-touch") although that is entirely possible as in the implementation with the touchpad technologies described above. In this case, one can use in successive or slide mode only one actuator, either finger or thumb, on surfaces analogous to those of a virtual keyboard (for example, a keyboard shown on a touch screen or activate a ball by a computer mouse, or stylus on surfaces of the size of a large cursor (FIG. 3). FIG. 3 illustrates an example. In text processing software, an intelligent cursor shows a grid (31) representing the virtual keyboard and in which the different zones to be activated are designated by the stylus (32) to produce the desired object (here the "right rear" box was designated, in order to produce the letter "U" in conformance with the table of FIG. 5).

Our devices also apply when the detection zone is virtual, for example, when the logical zones are simulated by a computer for interacting with an electronic pointer, mouse type, which is then the single actuator handled, in successive or slide mode, by the user's hand, which can be away from the screen without any other device than the current equipment from a computer and software to be installed for emulating the system's keyboard. In practice, this virtual implementation will be advantageously combined with the implementations of sensitive zones placed under the fingers, in particular in a manner to ease the user's cognitive transition from the dominant graphic HMI with pointer towards the use of the additional HMI where the movement of the fingers is sufficient to designate and confirm a computer object, presented in the symbolic representation which a conventional virtual command device in fact implements.

A significant feature is being able to be implemented in multiple ways according to the available materials, in particular, by simple installation of ad hoc software and personal tables of the user.

Visual, Audio, Tactile and Kinesthetic Feedback

Whereas with the conventional keyboards, in particular in their implementations for mobile objects, the large majority of users look at which key to act on with their fingers which they guide with their eyes, or with the mouse, the feedback is visual on the screen, the well-designed chording keyboards simplify the movements made by the fingers and for the majority of the users make use of tactile feedback from the fingertips and kinesthetic feedback from the relative movement of the phalanges.

This tactile and kinesthetic capacity is particularly optimized with Example 1. Since there are only two positions (FIG. 4, (a) and (b)) of the fingertips on the rebound surface, this gives rise to distinct sensations in the fingertips which makes it possible for the user's brain to know, before raising the fingers, whether they are well positioned where they must be for designating a given combination. In fact, the fingertip is extremely sensitive and makes it possible to distinguish between two positions of the finger very close together such as illustrated by FIG. 4. This information is reinforced by differentiated implementations, potentially with vibration generators, of the surfaces of the different sensitive zones assigned to a single finger, perhaps by creating a sensitive border like a hollow for separation, and by the kinesthetic sensation of the angles of the phalanges. This good tactile feedback with implementation 1 makes it possible for the users to reach more quickly the reflex mode where the conscious mind is no longer called upon to control the fingers' movements, which frees the users' attention from entry actions and makes it possible to reach more quickly, after less time using it, the maximum speed allowed by the intrinsic tapping speed capacity of the fingers of the users' hands (15 taps (cycles) per second maximum for a virtuoso pianist or flautist to three to five for a person less agile with their fingers).

These tactile and kinesthetic capacities of the human hand and mind do not block the implementer of a DED from providing a presentation in echo of the position of the fingers, for example, in the form of a tactile range of active zones corresponding with the sensitive zones of the DED or of an audio or visual echo according to the means for interactive guiding before validation of the combinations invoked above.

Possible Dimensions for the Implementation of Sensitive Zones 1 to 6

The dimensions of the DED according to Example 1 vary according to the actuators used.

When the DED is made to be activated by three fingers, the DED must have at a minimum the width of the central finger and half that of the two left and right fingers, increased by two spaces for movement, which, depending on the person, is a minimum total width which could get down to 30 mm.

In height, one of the important features is that because of the fact that the sensitive zones of one main zone assigned to a finger are only very rarely logically activated together, it is sufficient that the main zone detects that the actuator is more front or more rear for distinguishing the two cases. Pressing/Activating two sensitive zones from one main zone simultaneously with the same finger is equivalent to creating a third zone between the two and further requires the precaution of avoiding bad presses relative to what is targeted and thus slowing the action and increasing the necessary areas. However, that can be a preferable compromise in certain cases and with certain technologies. In all cases, these simultaneous presses by a single finger of several zones must remain limited to a few cases (not more than 10), easy to do with the fingers. Thus, in height, a DED can be as little as a few millimeters. The trade-off for a small height is that one cannot move as fast as with more amply dimensioned heights, for fear of being outside the detectable zone. But this can be a very interesting compromise in mobile and discrete situations.

These minimal dimensions are not an obligation because often the user will prefer to have a comfortable surface that can also serve as a pad for tracking movements associated with the pointer. 60 mm×20 mm seem to be dimensions that can be agreeable to many users.

When the DED is used in successive mode by two finger actuators (such as two thumbs), or even one, the dimensions can be reduced without the user having to look at their fingers-like such as, for example, in the implementation of FIG. 21.

In successive mode activated by a stylus, the dimensions can be as little as a few $mm^2$, but the user's attention is called on.

In summary, the DED according to Example 1 can be a very compact device all while being powerful (36 in base but able to go up to 108 possible combinations in a single cycle of action of the fingers). The size reduction, therefore, translates into a certain reduction of possible speeds, but without going below the writing speed with the other known writing means on mobile objects.

Example 2

Figure 9:
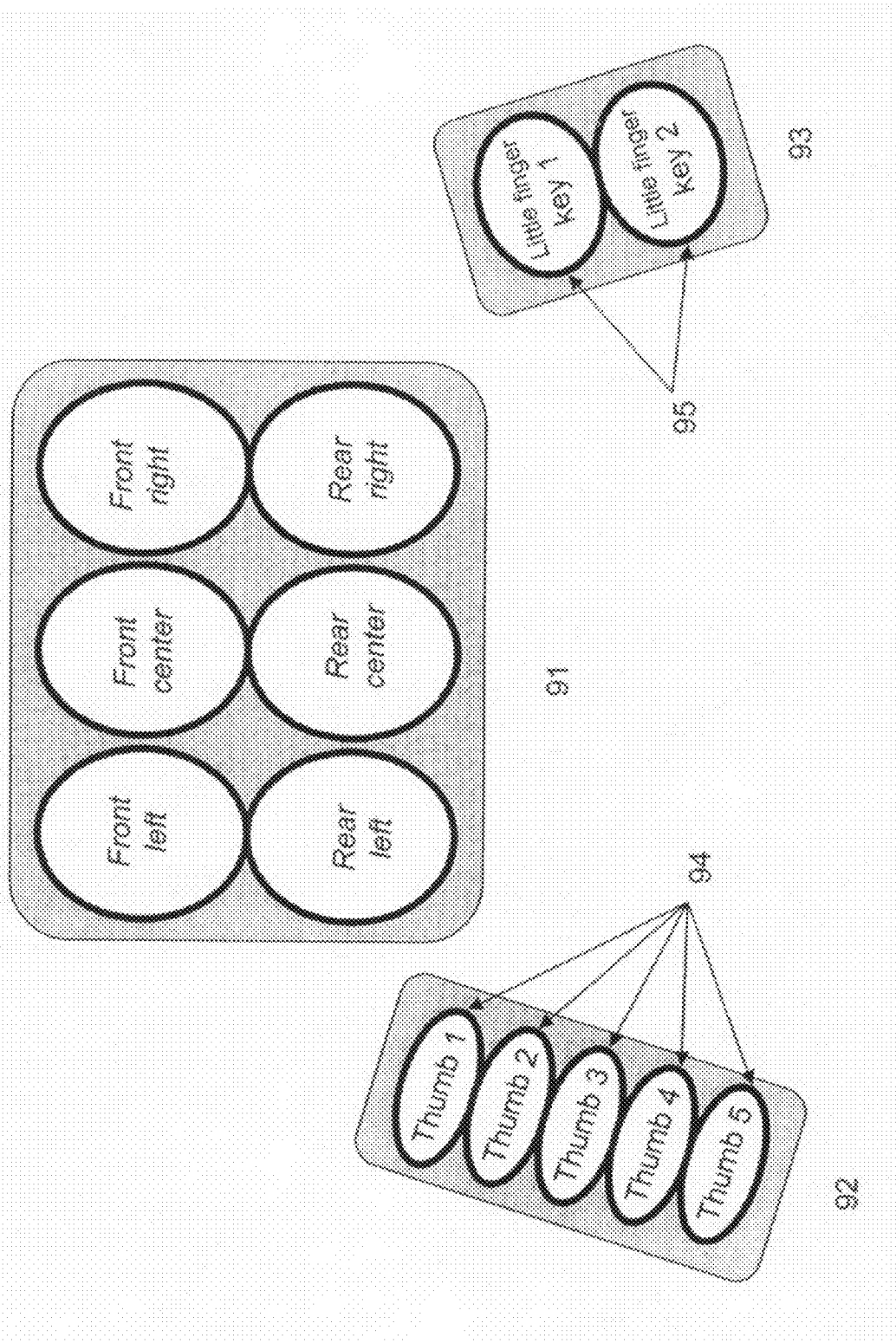

As illustrated by FIG. 9, another aspect includes defining five principal zones: three identical to the Example 1 defined previously (91) for the three nimble fingers, one principle zone (92) associated with the thumb and one principle zone (93) associated with the little finger.

The principle zone for the thumb includes five logical sensitive zones (94) providing for six states and that for the little finger includes two (95) for three states.

By logically positioning these two additional main zones as "modifying" keys (like Shift or Ctrl or Alt on conventional keyboards), this type of implementation considerably increases the number of possible combinations in a single action cycle of the fingers, exceeding the constraints discussed above during the description of Example 1, which makes it possible to go towards "Simultaneous" processes, without order, therefore much more quickly and favoring reaching reflexive mode, an additional factor of quickness. The constraint is reported on the size, where the type 2 implementations are by nature larger than the type 1 implementation.

Possible Dimensions for Implementation of 2 to 5 Main Zones

Relative to Example 1 whose main objective was the smallest size, the main objective of a type 2 example is to allow the effective and comfortable use of five fingers.

The minimum size is, therefore, that of a credit card, where the thumb and little finger are required to pull in a little under the hand. The next comfortable size is that of a calendar, for example 70 mm×110 mm. Objects for use on a table could reach the A5 layout. The effective sizes of hands and their shapes, which are very different and varied, lead to the idea that there will exist a wide variety of DED.

The technologies are a priori the same as for Example 1, with a greater importance for the single or multiple "pointer" function.

Figure 10:
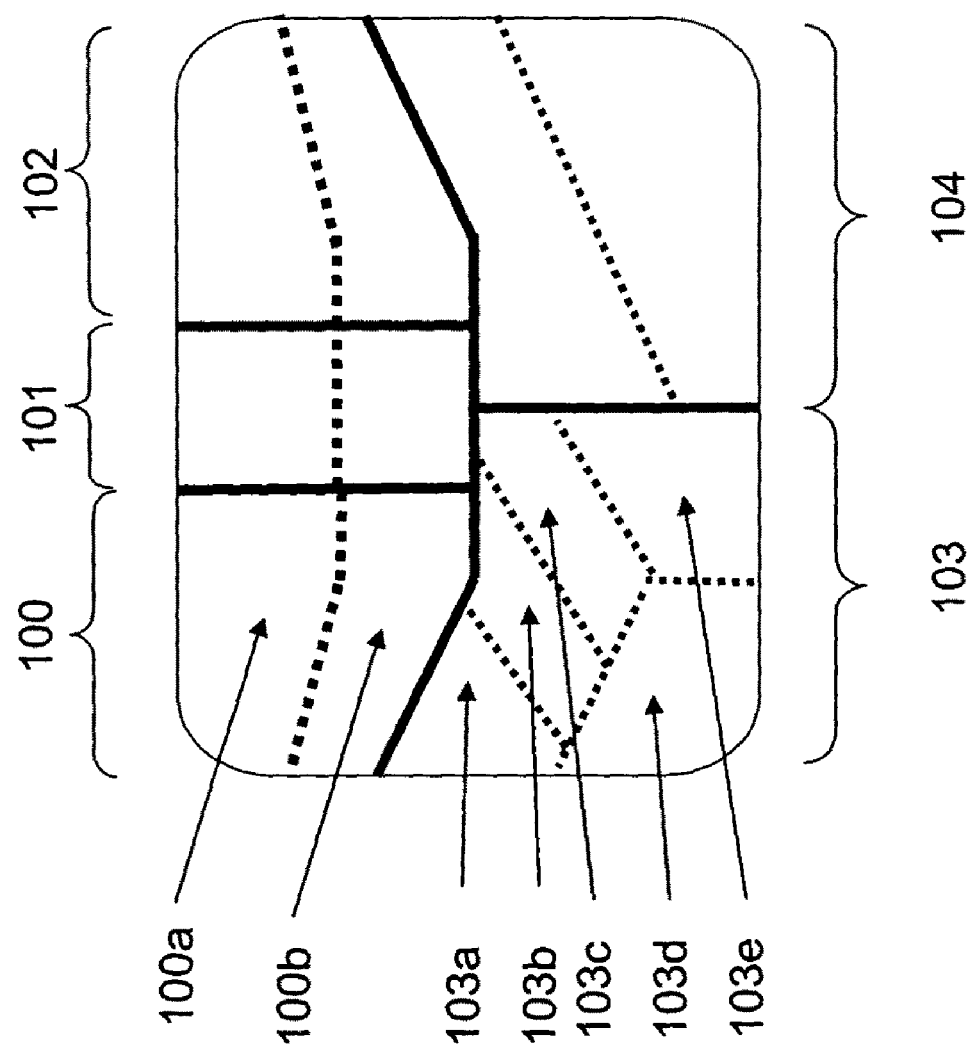

In this case, the implementation will tend to make it so that the five main zones are contiguous and together implement a sort of graphic tablet, as shown by FIG. 10. In that illustration, the solid lines indicate the limits of the five main independent zones (100 to 104) and the dotted lines, separate them one from another in exclusive sensitive zones (10xa, 10xb, ..., where x=0 to 4) within a single main zone.

For the mouse enhanced with a type 2 implementation, the fact that the thumb and little finger are used poses the problem of involuntarily moving the mouse during the entry operation. In fact, the solutions brought up above (keys in the center of gravity, fairly flat shapes, antiskid pads, and software program for temporarily decoupling the screen pointer) proves sufficient. Alternatively, the pointing device can also advantageously no longer be a mouse, but a touchpad or other solution where it is an actuator which moves and not the entire DED. These static implementations correspond to users more oriented to "keyboards" and "keyboard shortcuts" for whom the pointer is a support and not the other way around for mouse oriented users (currently the large majority), and to uses where one cannot have a surface for moving the mouse.

Rotation or Substitution of Tables

Still in reference to FIG. 9, the main zones associated with the thumb (92) and the little finger (93) make it possible, according to a conceptual design for arrangement of the available raw combinations and according to their combination, to change the active table of 36, 33, 30 or 26 boxes whose objects can be designated by a combination of three nimble fingers. For us, the term strip names the set of 26, 30, 33 or 36 (portable up to 50 or 108 for "Advanced" and "Tritap" processes") objects which can be designated by a combination of nimble fingers on the type 1 implementation presented above, for given thumb and little finger positions. The thumb and little finger zones are then in this case Shift, Ctrl, Alt, AltGr, Fn, Win or Apple etc. type, meaning modifying keys, a universally used well established concept for increasing the number of signs and commands that are possible with a set number of keys. The term table therefore brings together all the possible strips according to the "thumb+little finger" combinations. In case 2, there are six different strips that can be designated according to the six possible states of the thumb on its main zone, which with the action of the little finger between its three states makes it possible to designate 18 different strips by the simple positioning of the thumb or the little finger done within a base cycle for designation and validation of a combination.

In a particular implementation and configuration of the means for validation of the combinations, it is not necessary to deactivate the thumb or little finger zones for confirming a combination depending on the three nimble fingers. This makes it possible to limit the cases where the four or five fingers must move in a single cycle, which is all the same still more difficult for everyone, but especially for the beginner, than moving only one, two or three nimble fingers. As was seen above and will be seen below for guiding, there is in the design a clearing time delay (tempo2) that clears a specific sensitive zone which was activated and deactivated before the validation could be calculated and acted. Because of this, movement of the thumb or little finger, while at least one of the three nimble fingers activates a sensitive zone, translates into the simple change of the associated strip and, therefore, of the box and the content which will be confirmed and activated by the deactivation of only the zones of the three nimble fingers.

Although the role of the zones assigned to the thumb and little finger are preferentially seen for reasons of mental reference by the user and allowing operation of the guiding tree as that of rotation of the strip and table, a box useful for holding frequently used objects is naturally assigned to the particular combination only calling on a single finger acting only on one of the thumb or little finger zones. This defines a second role for the sensitive zones of the thumb and little finger. To make the production of these objects easier, like the space character, adding it to the object activated by the validation of the nimble fingers when the thumb or little finger zone is deactivated at the same time can be configured. For example, if the object activated is the last letter of a word, the space is automatically added just by lifting the thumb simultaneously with the validation of this last letter of a word, where the thumb had previously been placed on the zone calling a strip of lowercase or uppercase letters and associated with a box where the space was located.

This mode of action of rotation/substitution of a strip for another is supplemented by the fact that it is anticipated that the commands for strip or table rotation can be placed as objects in boxes of the strip, calling small computer programs internal to the DED device. These objects internal to the DED for control of band or table rotation are particularly useful when in a type 1 implementation situation with only 36 boxes available or accessible because of a reduced number of available actuators. These table or strip rotations can be either temporary for a following combination or locked until a different table rotation order ends the active role held by the called table or strip. These small programs can be very flexible objects making it possible, for example, to lock in the table or strip called by leaving the finger(s) which called the strip and unlocking it by returning to the previous strip when the finger(s) is raised, which in some way re-creates the conventional combinatorial use of capital type.

In another aspect, rotation between two strips or tables is done automatically by the detection of a new application context. For example, if the DED is used for the entry of text in a text processing application, the switch to a spreadsheet application like Excel (company's name) will make it useful to change the strip in order to have available a quick designation of functions and commands specific to this context.

In Example 2, with five principal zones, it is normally expected that the user will make use of all five fingers. It can happen that this is not possible or desired. In that case, they could configure their designation process, for example, by an internal computer program arranged as an object in one box, so that the thumb and little finger sensitive zones, or even any other, can be locked out, meaning blocked, without there being a need for leaving a finger in the corresponding sensitive zone all while keeping the capacity for validating combinations to which they belong.

DED Pointing Devices

Considering FIG. 1 or FIG. 9, the use of certain technologies for the detection zones makes it possible to obtain a surface or continuous volume, FIG. 10, on or in which the continuous movement of an actuator can be determined.

In that case, the implementation will advantageously make it such that the five main zones together realize a sort of graphical tablet, as illustrated by FIG. 10. In that illustration, the solid lines indicate the limits of the five main independent zones (100 to 104) and the dotted lines, separate them one from another in exclusive sensitive zones (10xa, 10xb, ..., where x=0 to 4) within a single main zone.

In another aspect, the device, therefore, includes means making it possible to interpret the sliding of an actuator on the detection zones as sliding of a computer mouse type electronic pointer. The means are of the software type making it possible to interpret the coordinates transmitted by the sensor module for converting them into movement of a pointer in a computer system. This in particular makes it possible to move quickly without significantly moving a hand from a data input mode to that of electronic pointer and vice versa.

Specifically, applicable in the case where the principal zones are independent ("multi-touch" as known in the art), for each principal zone there corresponds a part of the screen on which the pointer device is available, or a specific pointer device to each part of the screen defined from the output. This solution in particular makes it possible to move very quickly from one part of the screen to the other without having to make their actuator slide from one end of the screen to the other or of managing, and coming and going between several independent cursors which make it possible to manage several separated tasks in one or more documents or windows. In the case of an audio presentation of the screen content, this absolute correspondence associated to the physically perceptible main zones by the five parts of the hand makes possible a quick analysis of the content of a screen and of what moved where, without having to log at a screen, for example by audio or tactile presentation, according to known processes for blind people using a computer.

In a particular aspect, all of the main zones form a single super zone dedicated to a mouse usage.

In another particular aspect, the mouse function is implemented on joystick or touch pad type means juxtaposed to the device's sensitive detection zones.

Figure 23:
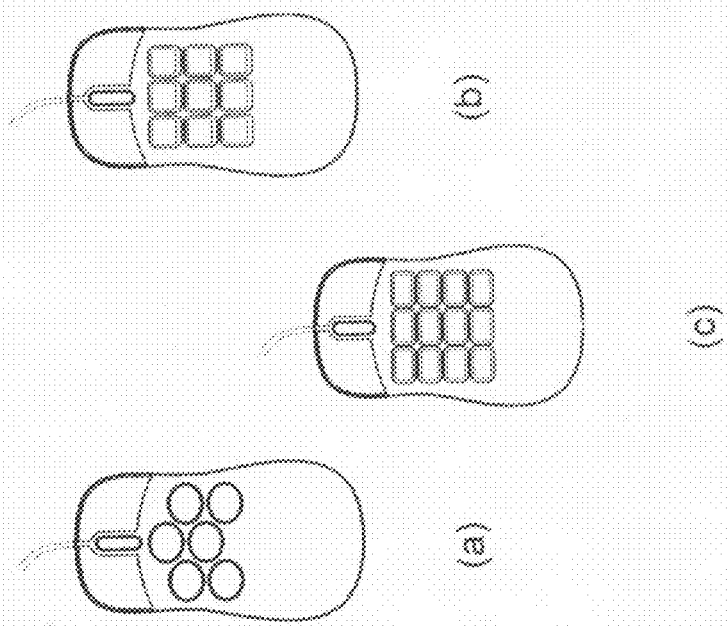
FIG. 23 illustrates implementation of a DED as a set of 6, 9 or 12 keys added on the back of a mouse otherwise having a conventional number of contacts (left and right click, wheel, under the thumb, etc.)

In yet another particular aspect, notably for use on a table or other surface, the DED is naturally installed on the upper part of a mouse, the ultra dominant pointing system, conventionally made. The simplest solution, but not inevitably adapted to mobile contexts, is in fact to place the conventional keys on the top of a mouse and FIG. 23. FIG. 23a corresponds to the installation of a type 1 implementation, FIGS. 23b and 23c to installation of type 2 implementations. The 23a implementation is naturally ambidextrous, the three principal zones, left, middle and right, remain as they are whatever the fingers which use them. The implementations 23b and 23c are also ambidextrous, by means of a permutation of the zones assigned to the thumb and little finger. To make the whole thing easy to handle it is necessary to make the mouse fairly flat, to make it so that the mouse click and wheel are oriented towards the interior of the surface, that the chording keys are substantially softer and more limited range of travel than for a standard keyboard, that the shape of the mouse seen from above allows it to be effectively held between the thumb and little finger and finally that the total mass and sliding pads of the mouse limit unintended movements of the mouse while acting above with the three fingers or even with the three fingers and thumb, FIG. 23b, or five fingers, FIG. 23c. High resolution optics (above 800 dpi) well adapted to mice with small movements is very suitable to an implementation. Software programs inhibiting the possible movement of the pointer during typing make it possible, without asking anything of the user, to keep for the mouse all the ergonomics which is associated with it. To consider the small delays separating the last mouse/pointer use from the validation of a first sensitive zone of the DED, which inhibits the pointer, and between two successive productions of the DED, a time delay (tempo6) makes it possible to clear and cancel the involuntary movement if there is any during this small interval.

Conduct of a Designation-Validation Process

Figure 11:
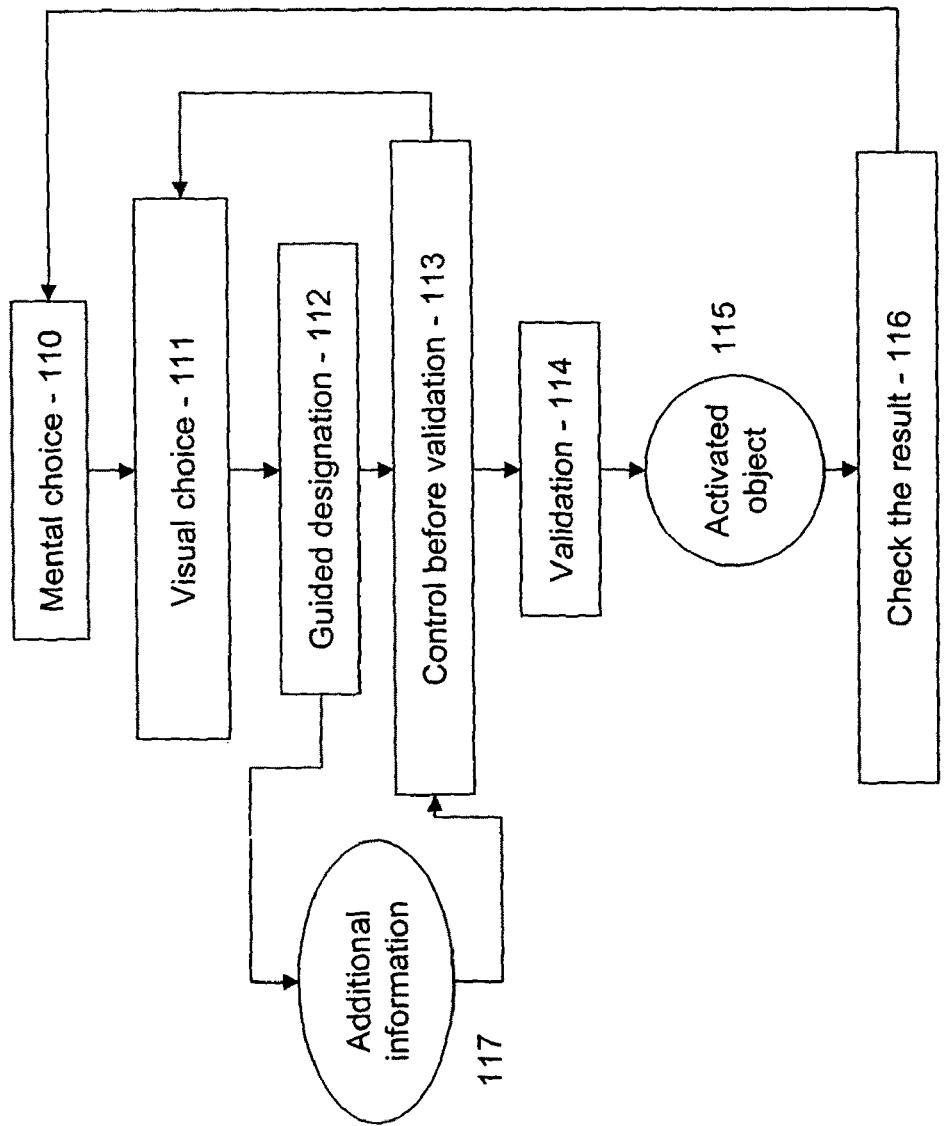
FIG. 11 is a flow diagram of the activation of an object.

FIG. 11 illustrates the production of an object.

By referring to the structure from FIG. 1, and according to the strip from FIG. 5, the user designates (interactive designation guided or not) (112) a combination of logical zones using one to three of their three nimble fingers, for example if each of the three fingers is in "front" position on its main zone, the combination designates the box containing the letter "Y". The user then performs a validation operation (114) which activates the object (115).

In a more complete aspect for which the DED is equipped with a presentation screen, for example, the creation process arises from the following sequence:

110: By thinking, the user determines what object he wants to produce.

111: The symbolic visual presentation (described below) of the information makes it possible for him to see how to designate this object.

112: Therefore he designates this object with or without guided interactive assistance, with the use of actuators (fingers).

113: The user verifies designation of the desired object, and sometimes makes use of additional information (117, for example, a small informative bubble or label displaying the functionality of the object when it is designated such as the information bubbles which are activated by computers when the mouse cursor is positioned over a Word button, (company's name) and which is shown to them to reinforce it.

114: The user validates a choice, for example, by raising fingers; the different means and modes of validation were described in more detail above.

115: The designated and validated object is thereby produced and activated.

116: Feedback (for example, letter which is written on the visualization screen, or vocal or tactile echo) allows the user to check the result.

Symbolic Presentation

There is also the question of the presentation of the information on the visualization screen (or any other presentation means) even while the device is being used.

Means, for example, software makes it possible to symbolically display on the screen the active strip and the means (meaning the sensitive zones that have to make up the combinations) to activate each of the elements from the strip.

Figure 13:
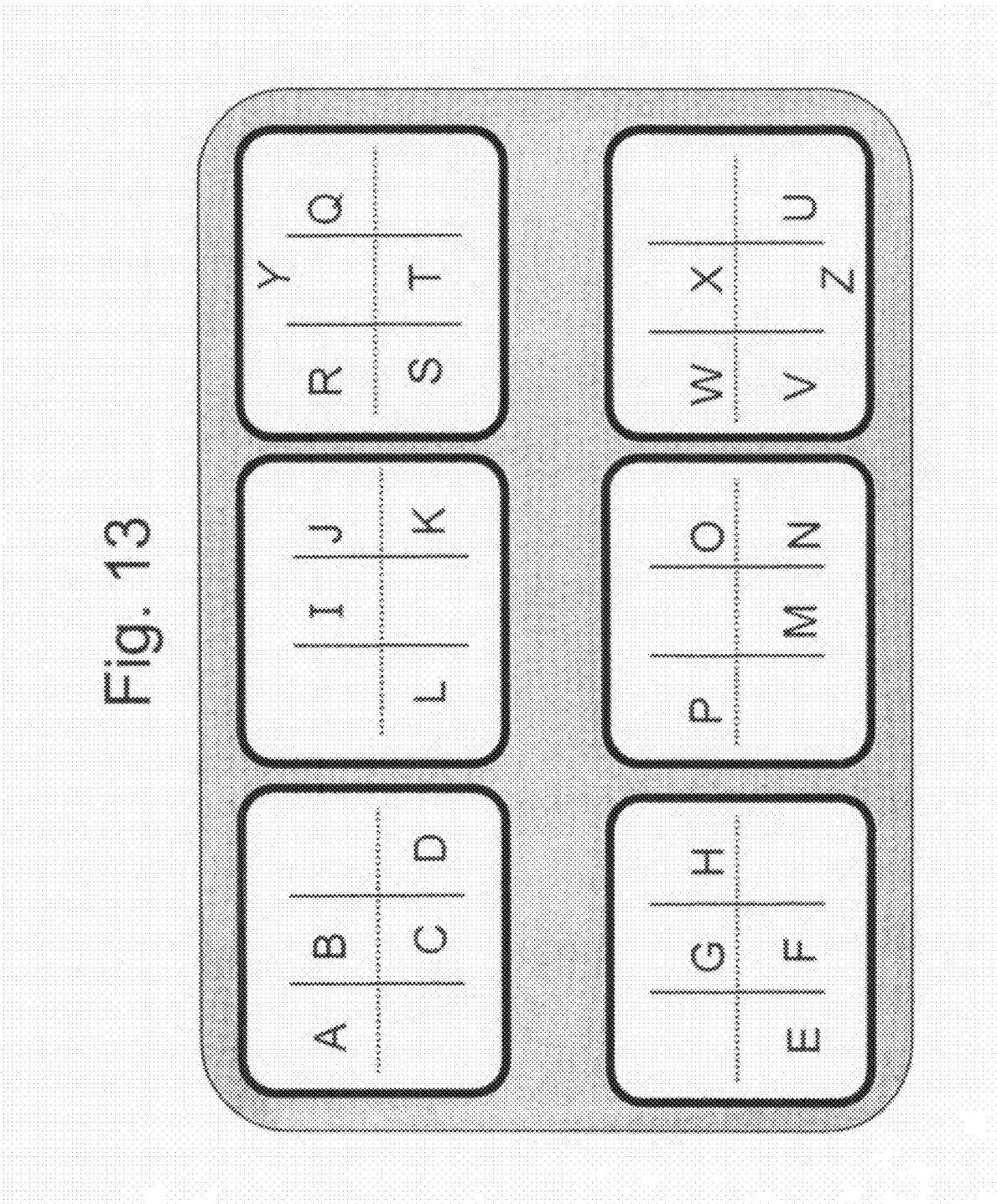
FIGS. 13, 14 and 15 show interactive visual guiding means for the designation and activation of objects.
Figure 14:
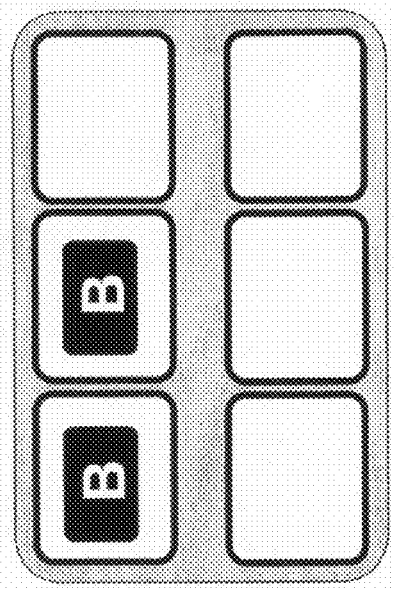

In reference to FIGS. 13 and 14, for an implementation type 1 arrangement such as that from FIG. 1, and for a strip whose order of layout of the 26 combinations is according to FIG. 5, the compact symbolic presentation consists of a map of 36 boxes or less distributed in six large zones themselves symbolized as checkerboards of six boxes (certain of which might not be filled out by an illustration).

In this symbolic representation, where, compared to illustration 5, there is no longer the representation of each checkerboard for each combination, the combination giving access to a box and its iconic content must be understood as including, as a first sensitive zone to be activated in Bitap or Successitap, the sensitive zone which is in the same relative position as the large zone which contains the targeted box and its content, and as a second sensitive zone which is in positional correspondence with the box itself relative to the five others.

For example, to designate a "B" the "left front" sensitive zone is first activated and then the "front center" sensitive zone. To designate a "T," the "front right" sensitive zone is first activated and then the "center rear" sensitive zone.

This representation remains similar, even when, for indicating that certain combinations are done with three fingers, some signs or symbols are added. Similarly, the combinations contained in a large box can be collectively represented by an icon, and only appear individually when the zone is selected/activated.

In the dynamic version of this presentation, the activation of a first sensitive zone triggers a display which now just shows the six boxes which were in the large zone of the map, and then after activation of the second sensitive zone, the indication of the sensitive zones activated and the single icon corresponding to the contents of the box thereby designated. Through the clearing time delay, deactivation of the zone causes the previous visualization to return.

This presentation of the strip itself is supplemented by a presentation which updates the objects presented during a rotation of the triggered strip, for example, by the action on a logic modification zone (thumb and/or little finger), or any other cause as brought up above.

Figure 16:
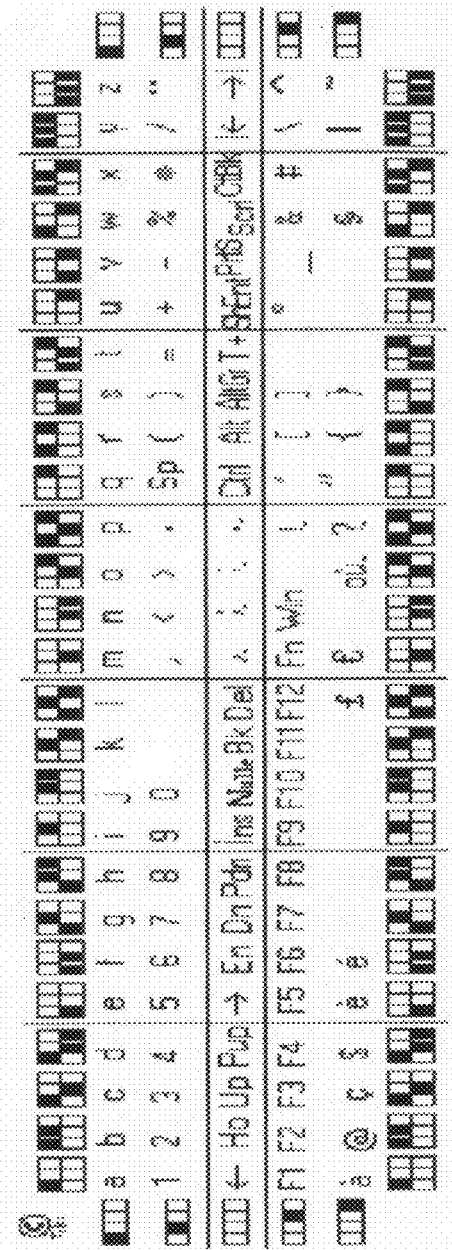
FIG. 16 is an example of canonical representation of a table of five strips containing objects.
Figure 17:
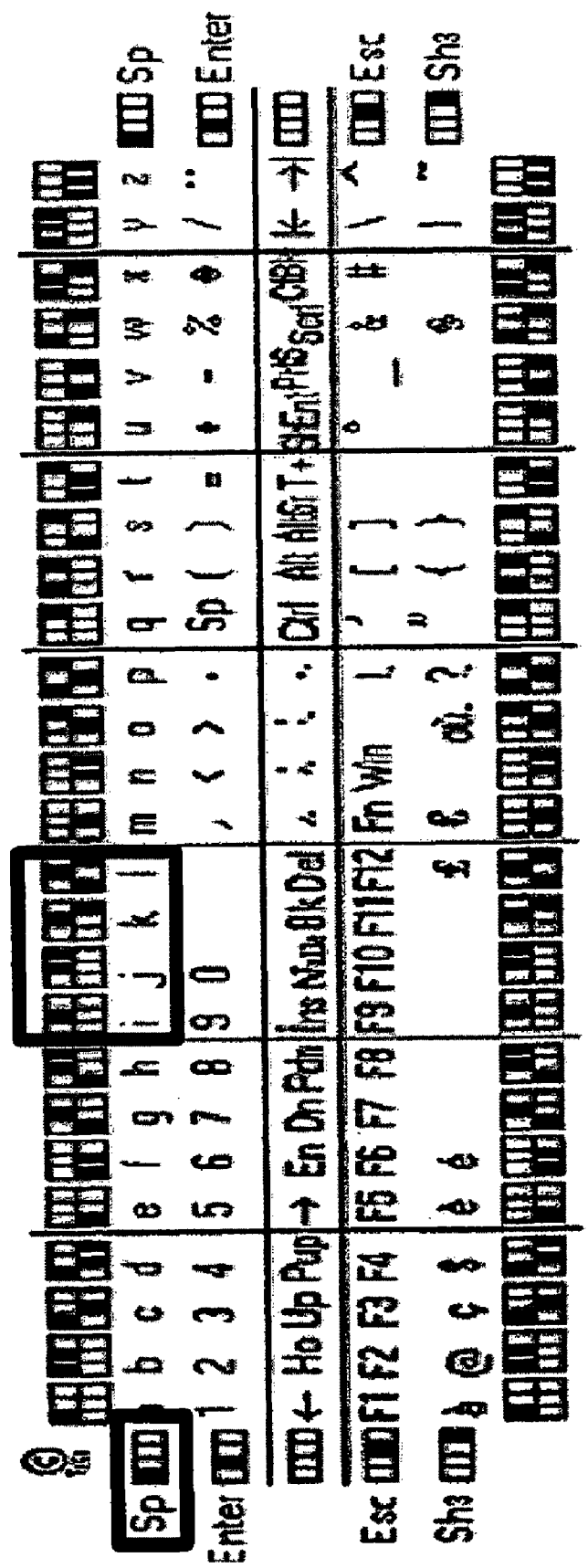
FIG. 17 illustrates an example of emphasizing possible combinations during a user's interaction with the canonical representation from FIG. 16.

In another aspect of the dynamic presentation illustrated by FIG. 16, in the form of a matrix with 26 (or 36) columns and N lines (N=2 to 18 realistically corresponding to the number of possible combinations in the modification zones, managed by the thumb and little finger, and to the current needs on a computer, allowing for switching between the strips) where each column corresponds to the combination of fingers for the associated box at one of the 26 (36) dominoes with six boxes from the reference strip, the dynamics of the presentation can be limited to the emphasis of the zones from the table which share with each other the sensitive zones already activated (FIG. 17). In the example from FIG. 17, the user activated an outer thumb zone and the middle front zone, and the four possible choices are the letters from the strip of Latin alphabet letters selected by the thumb position. By adding the finger on the right to its front position, the single letter "j" would be designated.

To guide the user among several tables or many strips, the components can be represented for graphical HMI and tree structures by icons illustrating groups of combinations (of other strips for example instead of the set of the icons for each combination, where each icon, when it is designated can be explained by a text label.

Figure 18:
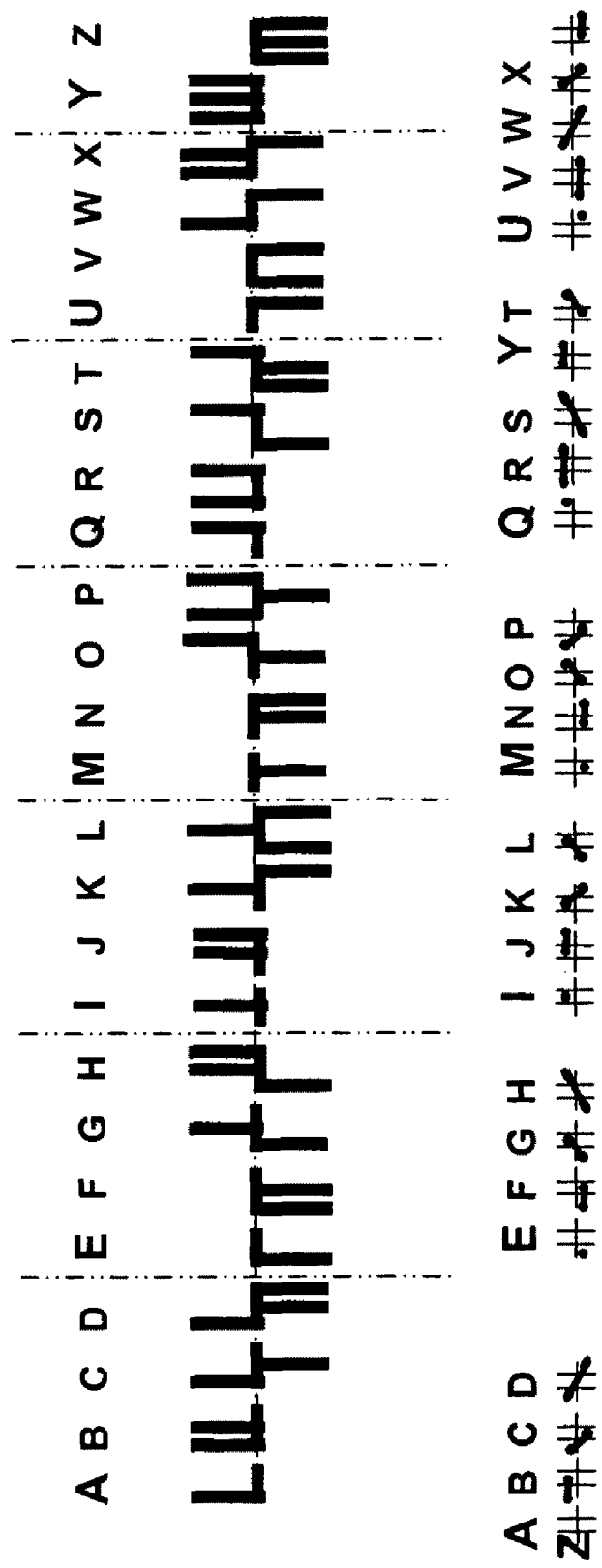
FIG. 18 illustrates several written forms, cursive and by points created by our device and methodology.

Other representations are also possible, in particular, that illustrated by FIG. 18, where the cursive shapes can be considered as being a production alphabet: a combination corresponds to each sign.

This manuscript writing which is initially a variant of the representation of the positions of the fingers on the sensitive zones, proves to have a great simplicity to produce in manuscript form, either in connected cursive manner or slid or pointed in a pre-existing grid, and proves as easy to recognize because it is formed from simple elements, easy to distinguish for a simple writing recognition device. For example, an optical pencil with some diodes or equivalent would easily detect the succession of upper and lower stems relative to the beginning and end of the central trace. Similarly, relative to a grid, physically represented or not, the vectors and the points are very easy to draw and, then, in real time or a posteriori, to detect, identify and connect to the models associated to the 36 base combinations. Up to six upper and lower accents are simple to identify also make it possible to define a base set of signs for changing reference tables, going up to 216 possibilities.

Similarly, a graphics-tablet system or touch screen and recognition software can easily do this processing, whereas they have difficulty recognizing more than 95% of the signs of common or even simplified handwriting.

The advantage of this writing, which is quicker to draw and has a significantly higher recognition rate than near handwriting of conventional graphics, is to extend the domain of usefulness for learning the chording system in situations where it is advantageous to handle a stylus or pencil with or without real-time electronics, or for recognizably annotating printed documents before scanning. The simplification of the recognition makes it possible to do it with fewer resources, more in real time, to the point of writing, without a special zone, etc.

As previously discussed, the symbolic representation according to FIG. 13 can advantageously be made equivalent to that of a virtual keyboard where the pointer and clicking make it possible to successively designate at a distance, with or without sensitive material zones, and then validate the combinations according to the method.

According to the user's degree of expertise, the nature, size, significance and permanence of the symbolic presentation will advantageously be adjustable. Several configurable levels can thereby be distinguished.

1. The permanent and dynamic level, but limited to a strip of 36 combinations according to the symbolic representation from illustration 13, with zoom on the six combinations remaining possible after a first press (FIG. 14).
2. The permanent level limited to a strip or extended to a table of several strips where the dynamic is limited to adding emphasis to the activated zones and combinations with their content which share these activated zones, as in FIGS. 16 and 17.
3. A level, for example at the cursor point where only the sign or command ready to be confirmed is displayed, and if needed changed according to the exploration before validation or cancellation, according to FIG. 3.
4. A level where the display has partially or totally faded after a certain time delay (tempo3), and does not come back to the foreground until a sensible zone is activated, which allows for the normal use of the mouse pointer on the screen zone which the presentation would have occupied.
5. A level where a display of several strips or all the active strips is kept in background and only reappears after the passage of a certain other keep-activated time delay (tempo4) for at least one sensitive zone, where this time delay is interpreted as a hesitation by the user, and where the display fades again after the validation of a combination.
6. A level where the display of how to do the possible commands in a given context, (by a symbolic image of the zones to be activated) is done dynamically, not in block specific to the DED, but next to each icon or element of the scrolling menu in progress with the movement of the pointer or change of context.
7. A level for the different types above increased for the object designated and ready to be confirmed, by the display of an explanatory label analogous to that associated to an icon or item from a scrolling menu according to the state-of-the-art of graphic HMI, where this explanatory label can be reduced to a few words or make up a real paragraph of Help.

Exploration—Learning

The combination of dynamic and static presentations previously described, and clearing process already described for the designation process, makes it possible for the novice or hesitant user (experts included) to explore the content of the various strips and adjust their fingers so as to correctly make the desired combination while they still have not yet validated their combination.

This exploration and these adjustments are necessary for non-expert use of chording keyboards which inevitably lead to hesitations and corrections of the designated combination.

They are in particular implementable by using the clearing process already described above with the "Bitap", "Successitap" and "Simultaneous" processes, which consider as logically active the zones which have not been physically released and those which have been released only within a configurable threshold interval (tempo2 and tempo0), which characterize the clearing of a sensitive zone that was activated. All sensitive zones are logically deactivated after validation. This solution also makes it possible to clearly distinguish the sensitive zones that are part of a combination validated together and those that are not part of it.

In the case of "Bitap", since raising the actuator from the second sensitive zone performs the validation, it is not possible to do the above exploration unless the technology used for the sensitive zone allows sliding towards another sensitive zone without lifting the actuator or if a second actuator can activate another sensitive zone without having first raised the first actuator. In the case where "Bitap" is not implemented in a mixed process with "Successitap" or "Simultaneous", it can be implemented so that leaving the actuator in contact with the sensitive zone for a period greater than a time delay (tempos), is equivalent to stepping backward which is signaled to the user by returning to the previous presentation created after the first press, and authorizes the raising of the actuator without the validation taking place.

Figure 15:
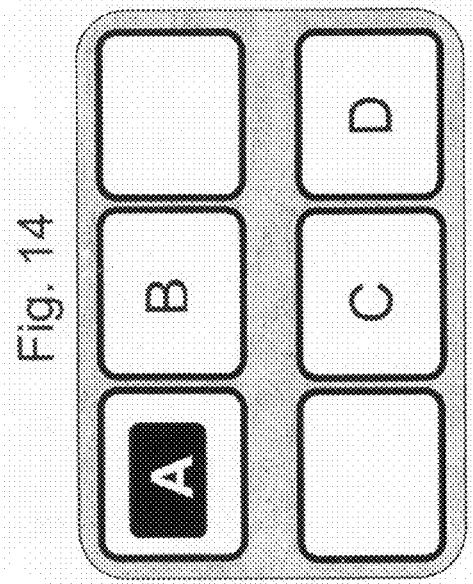

For a beginner, the presentation software puts visual emphasis on the activated and deactivated logical zones in step with the beginning user's interaction with the DED. This placement of emphasis is fundamental so the beginners know what they have already done to move towards the desired box and the object contained. This placement of emphasis is done according to the selected representation. For example, the placement of emphasis is done either in the form of successive screens (chaining of FIGS. 13, 14 and 15) or by highlighting the group of boxes sharing the activated zone and then the designated box before validation and if relevant stepping backwards and abandoning, where the displayed strip is changed according to the state or activation of a logic modification zone (FIGS. 16 and 17). In a representation according to FIG. 13, where the zoom function is not active or available, emphasizing the activated keys can be done by adding indices of different colors in the grids and putting emphasis on what is designated. The different colors can make it possible to distinguish among all the keys which are physically activated, those which are valid according to the active process, and those which are not because they are prohibited.

In a configurable implementation, the presentation can only become active after expiration of a time delay (tempo4) starting with the designation of a first logical zone, passing of this time delay is interpreted as a hesitation on the part of the user. The presentation is, therefore, proposed as an aid according to means configured by the user, advantageously bringing together several strips or zoom. Similarly the representation can fade out either right after validation or right after a time delay (tempo3) and go to the background of the active window, which allows the pointer to act and only return to the foreground when a sensitive zone is activated, either immediately for the beginner or after a configurable time delay (tempo4) mentioned above.

Since learning and its fear were what most blocked chording devices from emerging to the public at large, in a variant adaptive to the context, the visual presentation might not be made up as such, in graphic block additionally, which requires a certain visual shuttling between zones of the screen and depending upon the transparency chosen for the interactive graphic more or less hides what is below, but be associated to the existing presentation of available commands. For example, the symbolic representations in checkerboards of the positions of the fingers could be permanently or dynamically placed side by side with the fixed or scrolling icons and menus and different choices. In this manner, the beginner sees as they progress with practice in the old way how they could another time use only the movement of their fingers to activate a command.

As mentioned above, the visual presentation is one solution, but not the only one. In particular, in case there is no screen which corresponds to an advantageous use of the DED in social situations or movement or other observation activities, the presentation could be done in vocal or tactile form. In this latter case, the sensitive zones are each associated with a peak which acts on the skin when the sensitive zone is activated, either statically once, or by vibrating. This tactile presentation is additionally interesting for being able to present information of any type when neither a screen nor earpiece are possible, technically or socially. This tactile presentation could be, in a specific embodiment, associated with a watchband or bracelet containing the core of a no rebound surface DED (FIG. 2).

Hesitation—Cancellation

For a user who designated a logical zone in error, the DED can "clear" the logical zone designated in error once a time greater than the time delay (tempo2) previously defined in the different processes for raising simultaneously has passed after the user raised their finger from the incorrect zone, on the condition that there is still another sensitive zone assigned to a nimble finger which is physically activated, which can make it necessary to physically activate another zone assigned to a nimble finger before lifting the finger having an incorrect position. This possibility allows the user an accessible exploratory learning experience and also offers a reassuring tolerance of error for the beginner.

Among the possible corrections, when the user completely changes opinion before validation of an object that the user started to designate, a cancellation function is possible. This can be implemented by a principal, but nonlimiting mechanism: the active strip or the strip from the active table without thumb or little finger has at least one combination associated with this empty or Null object, created as an internal function of the DED for cancellation. For example, when the technology allows it, the special combination of pressing the six keys assigned to the three nimble fingers, or more generally, a combination easy to make by moving the fingers according to the clearing process. The user, by designating this object by using correction, hesitation and clearing mechanisms described previously and then by validating it, does not produce any object. This particularity avoids the user having to correct the results of an unintended activation, which is often easy with modern software, but not always, and most of the time costly in time and rhythm of work.

In an interesting variant, this Null function at the same time clears the memory containing information on the modifying and lock keys of all kinds in particular positions, which thereby leads to the return to a well-known reference position which is unambiguous and has no offset between what the user believes and the system knows.

Correction-Disambiguation-Prediction-Completion

We also provide a means for correction, disambiguation, prediction and completion which are implemented in the DED. Two aspects can be considered: the aspect of detection of the fingers and the semantic aspect of what was entered.

During the rapid entry of data by the user, they can perform an erroneous entry, much more so since the transition between certain pairs of object designations is not obvious for untrained fingers. Thus, the device includes material means by construction and configuration of the sensitivities, possibly even software, for correction of typing errors, in particular, very short and forceless (light touch) taps. The sensitive zones of a single main zone are nearly totally mutually exclusive, except in certain cases for actions which are not done very quickly. Because of this, if the actuator acts inadvertently onto zones, the system gives priority to the first which is lightly touched, and in the case of a simultaneous light touch, to that where the force or the surface area, depending on the technologies, are larger. Basically, the sensitive zones do not need, like conventional keyboard keys, to go past a threshold of movement and provide a sensation of collapse of resistance, and are in contrast at little or no movement for little or no force. In fact, first, the fingers which gallop at several taps per second would be slowed by these movements and forces, and further because the movements of the fingers are simple, there is no utility in discriminating between the desired key and its neighbors, nearly always brushed by touch typing with fingers moving over significant areas.

Further, in the case where the user has difficulty sequencing the production of a first object followed by a second object because their fingers position poorly and designate a third object by error, software means store this data in memory (sequencing object 1-object 2 delicate for this user) and provide means for easing and anticipating (therefore predicting and correcting) the errors: when the first object is produced, the logical zones associated with the second object can be enlarged to the detriment of those for the third object to facilitate production of the second object.

Another way to reduce the errors is to propose unordered two finger processes. This is possible, as previously discussed, when entering text and meaningful words in a given language. The principle is called "disambiguation" and was made famous by the T9 technique from Tegic. It consists of not asking the user to produce exact letters but being satisfied to produce a code associated with two (Suretype) or three/four (T9 or iTap) or six letters (Tengo) and let the software and its vocabulary tables, remove the ambiguities by suggesting syllables or words that the user only needs to choose instead of typing them, which is not always advantageous with the existing systems. In our case, if two keys among six are tapped simultaneously, each of the 18 possible combinations can only correspond to two distinct arrangements by the typing order of the two single keys, for example, "C" and "P" according to FIG. 7, which correspond to a low linguistic ambiguity, easy to deal with. A root or a single word will very often be the only possibility. In the case of several choices, the fact that with the chording keyboards one does not look at the keyboard, makes it possible to look only at the screen and, therefore, to see immediately the system messages, and then with the dynamic guiding associated with the interactive presentation (already described), to present the choices in a manner to select them with a combination linked to the position of the choice in the dynamic guiding, as illustrated in FIG. 19. Therefore, without having to activate the movement and OK keys, more or less distant; one sees and clicks, producing the implicit combination which is then faster than finishing typing the word. Therefore, when disambiguation software is available for the language in which a text is being created, one can have a simultaneously and very easily press with two fingers, thereby rapid and natural use for a user having started in "Bitap" and then "Successitap". In the context of disambiguation on only two elements, it is often also possible to proceed with automatic error corrections (elimination of words not having any meaning) or proposals so the user can self-correct by specifying during their typing the root or word that they really want in place of the incorrect root.

Beyond disambiguation, means are known for prediction and semantic completion based on dictionaries and the user's most frequent phrases, in particular, put to use in portable telephones. By software means, the DED offers the user semantic suggestions as a function, for example, of the objects immediately entered, and a syntactic and semantic analysis from the beginning of the phrase entered, and from context (software) in which the DED is used. When the active band present on the screen contains empty boxes, or boxes containing objects useless at that moment, it is modified to show the user one or several objects (words, portions of phrases, commands, etc.) proposed by the semantic or language prediction. Alternatively, an optional strip is created with one or several of these new objects and presented to the user in a favorable area of the screen. In particular, this is the case in FIG. 19 which shows three proposals which can be designated following the entry of the beginning of the word "Per". This modified or created strip is presented to the user visually or by any other means, if the user desires it. Thus, the latter can effectively produce the desired object more quickly if this is made part of the suggestions; whereas often with conventional systems, selecting a suggestion is slower than finishing typing the letters of the intended word without considering that if the user looks at the keys the user doesn't see the suggestion very early.

When the screen is large enough and the choices aren't too numerous, the suggested objects are presented in the boxes of a large domino or boxed dominoes in a manner that the selection of the preferred object can be done by an action of the fingers analogous to that of the production of the elementary objects remaining to be added to achieve a semantically correct word or phrase which is suited to the thought wanted by the user. This presentation gets its interest by the fact that the user of the DED according to the invention never looks at their hands or the DED, and is trained to mimetically interpret the symbolic representations and produce them rapidly.

This compact and easy to designate presentation applies to words and standard phrases. To facilitate the production of repetitive, conventional or typical texts, the symbolic presentation could carry on the strips where the phrases are represented by icons which when selected display the phrase and then produce it in block when the corresponding combination is confirmed. This method has meaning because the user can keep looking at the screen and call at will the strips of specific and individual objects. In the case brought up, the production of text is greatly accelerated and corresponds well to the contexts of Instant Messaging or text messages.

Automatic Configuration and Adaptation

The device may include software modules for the management of the steps and mechanisms previously described. This in particular makes it possible to offer a user configuration interface as a function of these objectives:

Choice of the time-delay threshold durations:
tempo0, in pure Bitap mode, defines the time available to the user for moving the single actuator from the first sensitive zone to the second,
tempo1 for the separation time between simultaneous and successive,
tempo2 for confirmation and for the clearing time delay for physically released zones,
tempo3 for managing the fading speed for interactive guiding, tempo4 for managing the reappearance of a guiding visualization when the user hesitates before validating or adding a finger, tempo5 for the clearing of the second Bitap press, tempo6 for the clearing of pointer movements before the inhibition triggered by the activation of the DED sensitive zone;

Choice of transparency levels for the interactive visualization,

Choice of the preferred designation and confirmation modes (Bitap, Slide, Successitap, Simultaneous, Mixed, Advanced, etc.), Configuration of the logical sensitive zones as a function of the morphology of the user's hand, Choice of actuators, Configuration of the tables/strips (nature of the objects, positioning of the objects according to preferences).

System

Figure 12:
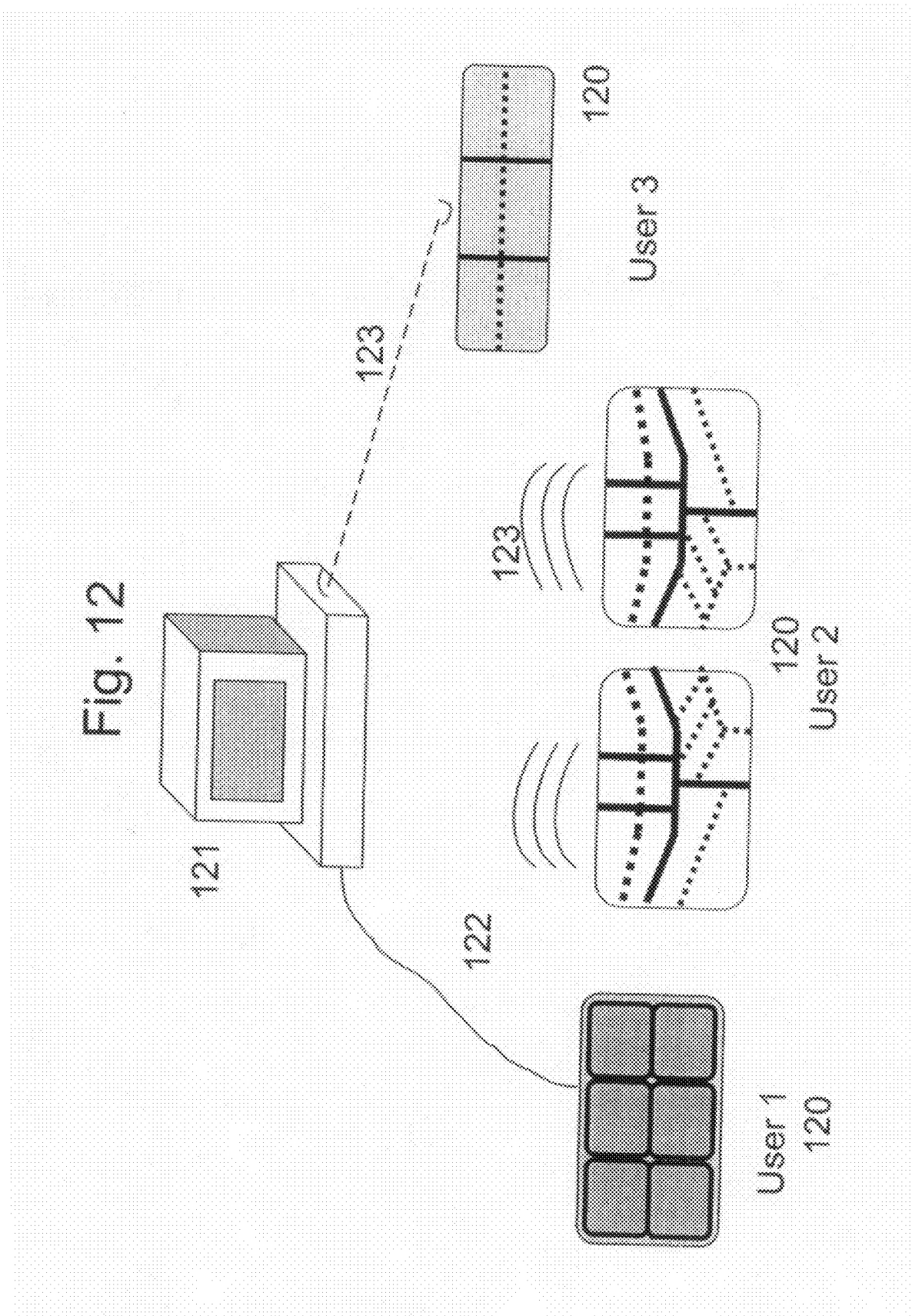
FIG. 12 illustrates a system in which three users interact.

In an aspect illustrated by FIG. 12, the DED device (120) is connected by a wired connection (122) (USB cable, network cable) or wireless connection (123) (infrared, Bluetooth, WiFi, RF or the like) to the equipment (121) where the data is entered.

The DED includes software means makes it possible to implement our methods and communicate with the equipment to which it is connected. Similarly, the equipment includes software means and can communicate with the DED and interpret the data sent for executing an action, for example.

The user, who wishes to perform an action on the equipment in question, produces the combination corresponding to the desired action by means of the DED. The DED transmits to the equipment some data which are interpreted by the equipment for producing the action. According to the possibilities for installing programs and putting tables implementing the invention in memory, or accessing hardware services means, a smaller or larger share, possibly null, of the method according to the invention will be done in the equipment, and the DED will do what cannot be done by this equipment.

Several DED can concurrently drive a single equipment. Such a scenario in particular makes game, conference or shared work session applications possible. This system has certain advantages: for a single person, but also for several people working or playing together by sharing only a local or duplicated screen and applications, where each is able to take part from their place all while easily watching what happens on the shared screen. Relative to what is feasible with conventional keyboards, the use of the DED provides significant advantages, in particular, the fact that only one hand is used for either entry, commands and pointing. Another advantage concerns the fact that the possible physical positions for the participants are more comfortable and more varied (less need for tables, standing positions and moving around made possible, etc.) and since the users do not need to look even furtively at the keyboard they can concentrate on what is shown on the shared screen or in the attentive global listening to the one who is talking.

A particular case relates to the case where two DED, potentially with different architectures, are connected and handled by each of the hands of a single user (user 2 from FIG. 12), thus putting up to 10 actuators into play. This configuration, which only involves users already experts with two hands allows, in particular, but not necessarily, making the typing of two successive signs totally independent, whereas on the conventional two-handed keyboards the independence is below 80%. Combined with the semantic correction and prediction software, possibly by using typing of phonetic syllables (only several tens in French compared to a few more than a thousand in orthographically correct) this system could be more productive than the fastest which currently exists: Qwerty-Azerty, direct Stenotype and VeloType (company's name).

The DED can also be an independent device having its own calculation means (interpretation software for the sensor, management software for the tables and the like) and possibly means for presentation of the object produced by the user: specific visualization screen, for example fixed on the back of the hand which acts on the DED, external visualization screen, sonic presentation means (voice synthesizer, speaker, headphones, earpieces and the like), means for tactile presentation and the like.

In contrast, the DED can be part of a client/server architecture. In a specific implementation, the DED includes the sensitive detection means (sensors), presentation means (a screen, speaker), network communication means (for example, WiFi, GSM or UMTS), software means making the human machine interface (HMI) and data transmission on the network possible. In this aspect, the DED is only one Human Machine Interface and the application services for the method are remoted to a server connected to the network. This DED could be either personal or shared, or specific to a given site and context, for terminals. Thus, the personalization data (structure of the strips, sizing of the sensitive zones and the like) are stored on the server and only the coordinates of the actuators determined through the sensor(s) are transmitted to the server. Real-time use, meaning fluid use comparable to the production of a normal user, can be achieved on current high-performance communication networks (GPRS, WiFi, UMTS and the like).

User parameters and customized programs may be temporarily installed in the DED terminal, according to known terminals and servers.

DED+Screen

In a particular aspect, the DED is connected to at least one display screen potentially by the intermediary of a computer. The display screen makes it possible to enrich the DED with useful modules for learning and using this combinatorial data entry device.

Even more favorable aspects for use in mobility situations will associate the DED with voice synthesis and audio presentation via an earpiece, much less intrusive for third parties than a screen. The least intrusive is the tactile presentation on a large enough area of skin, for example on the wrist in a bracelet potentially associated with the core of the detection device, according to FIG. 2.

Implementation Example

DED Integrated into Portable Telephone

A specific application for the DED relates to mobile telephones which are becoming more and more terminals and therefore need a Human Machine Interface going beyond the historic 12 keys, cursor movement management and "enter" and "escape" keys.

Figure 20:
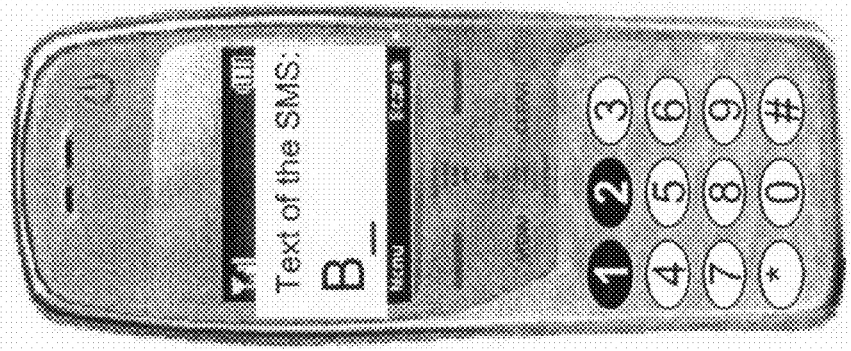

According to the choice of the manufacturer or later by the user, five main elements are possible with the DED:

Installation1 limited to the software implementing the process and based on 6+4+2 keys taken on a standard numeric keypad, for example, according to FIG. 20. Only the Bitap and Successitap modes for two thumbs are practically possible because of the pressing hardness of standard keys, but already make possible entry and commands without looking at the keys at all, much faster and more sophisticated than the conventional keypads and processes. In the example from FIG. 20, and with the grammar from FIG. 5, the usual mobile telephone keys are used and pressing the keys "1" and "2" produces the letter "B". Therefore, this software implementation provides the power and flexibility of a virtual keyboard without requiring having to install a more costly and fragile touch screen.

Installation2 of a type 1 implementation based on touchpad multi-touch technologies by replacing only the cursor manager according to FIG. 21. The DED band is the width of the telephone and 1 cm high. It can be used in Bitap, Slide, Successitap, Tritap, Simultap, Mixed and Advanced according to whether the user has one hand or two to hold and operate their device. The DED makes it possible to do and accelerate all a telephone's HMI actions. In the example from FIG. 21, the strip (210) is used in slide mode. For this purpose, the slide (211) between the two boxes "front left" and "front center" produced the letter "B" (grammar from FIG. 5).

Installation3 of a type 2 implementation based on commercial touchpad technologies, according to FIG. 22. The multi-touchpad covers all or part of the telephone's non-screen surface. The classic keys are shown on the surface and can be activated by simple software switch. In DED mode, a simple software addition, it allows the uses of implementation1 plus a use with four or five fingers, right or left hand, and use of a mouse. The manufacturer can in particular significantly increase the already common universal wireless remote control functionalities of their phone, currently limited and slow because of the constraints of conventional keyboards for mobile objects. With the DED, the telephone can then really act very powerfully and quickly on all the electronic objects carried by the person and those that he encounters.

Installation4 of a type 1 or 2 implementation directly on the touch screen, either mono-touch only allowing Bitap or Slide presses with fingers or stylus, or multi-touch and also allowing Successitap, Tritap, Simultap, Mixed, and Advanced uses.

Finally, installation5, the user can obtain directly from the manufacturer or from a separate DED supplier, a DED, distinct from the telephone and acting on it remotely or re-integrated with it through a sleeve and ad hoc connections and situations corresponding to FIG. 12.

Example of DED Implementation with Authentication and Identification

The DED is an electronic object which communicates with external means. When these are not passive and can communicate with the DED and control what it transmits, it is advantageous to include in the electronic system of the DED authentication means for the DED and Identification of the user communicating with these external means according to processes which users cannot bypass.

For example, the DED can integrate an electronic security chip through which the DED can pass when it receives specific requests after having or before having inserted user entered information.

Further, the manner of moving the fingers can characterize a given individual fairly strongly. In such an implementation, beyond the underlying dialogue of the electronic chip authenticating the DED object which is connected, this system can add in an automated manner, without calling on the user, regular verifications of the identity of the current user. This new solution would be juxtaposed, for security risks defined by the ad hoc managers, to conventional requests for entry of information that the user alone is deemed to know and protect from disclosure, or placing a finger on a biometric reader. By integrating the authentication and identification means for a person in a personal DED that this person transports and uses for personal reasons, the objects called "Tokens" are made much more comfortable to use. This way, the DED makes it much easier to substantially increase the security on networks and mobile phones, by replacing the "log in"+"password" combination whose well-known weaknesses have not stopped it from remaining dominant, because of the heavy constraints of the Tokens (they require wearing a specific object which interrupts work).

By applying the above implementations to telephone networks (fixed, DECT, GSM, CDMA, UMTS and the like) and mobile IT (GPRS, WiFi, UMTS) networks, it appears that the chip which is currently kept fairly immobile in a given terminal, can logically be taken out of it and create much more flexible conditions for use of all sorts of terminals, personal or made available by third parties and for access to protected locations, through a personal DED, provided with means of authentication and identification that the person uses any way quite naturally and frequently because it is always with the user.

Figure 26:
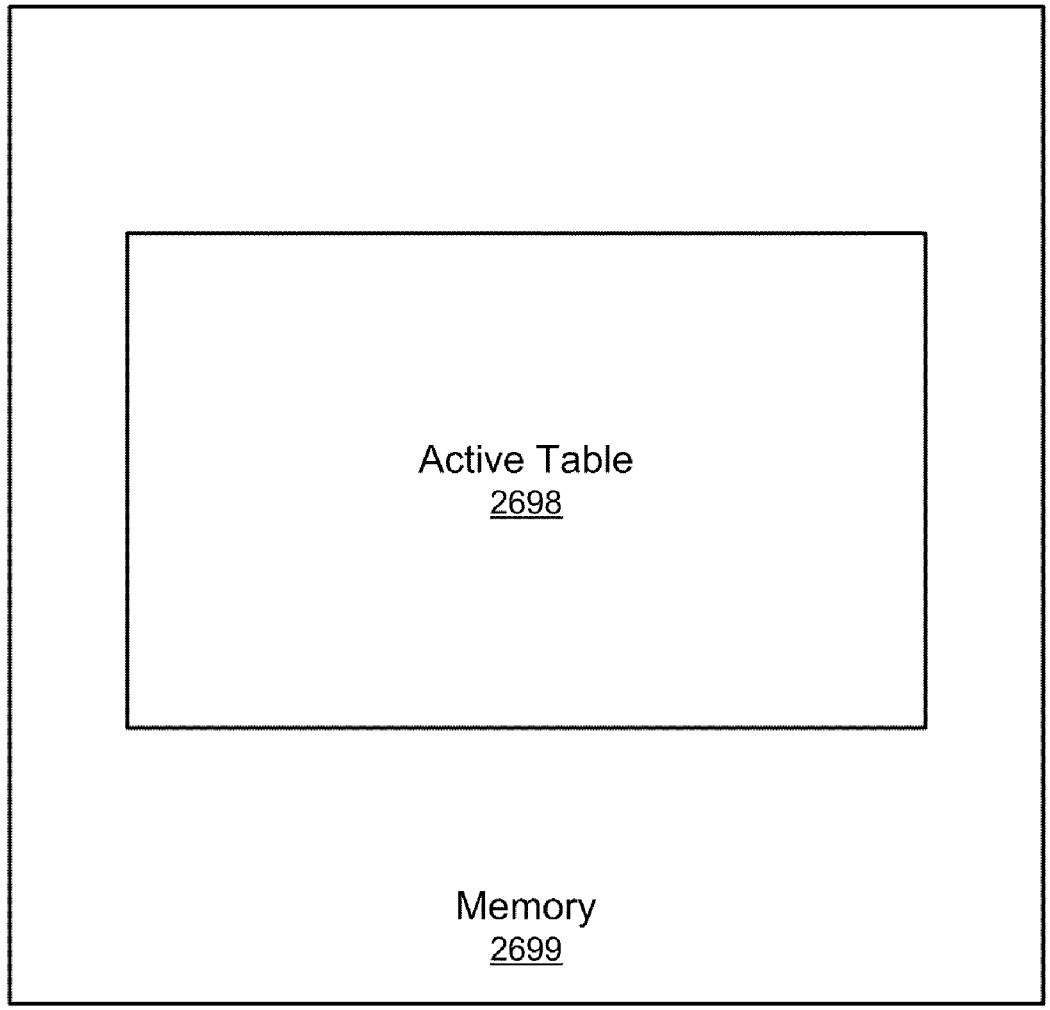
FIG. 26 shows a memory having an active table in accordance with one or more embodiments of the invention.

FIG. 26 shows a memory (2699) having an active table (2698) in accordance with one or more embodiments of the invention. The memory (2699) may be located within any DED mentioned above. The active table (2698) may correspond to any active table mentioned above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of entering data on a data entry device (DED) comprising a plurality of sensitive zones, the method comprising:

identifying, by a processor, a first activation of a first sensitive zone (SZ) of the plurality of sensitive zones by a user;

identifying, by the processor, a first activation of a second SZ of the plurality of sensitive zones after identifying the first activation of the first SZ;

identifying, by the processor, a first time delay between the first activation of the first SZ and the first activation of the second SZ;

invoking, by the processor and in response to the first time delay exceeding a first time delay threshold, a successive mode;

selecting, by the processor and from a first active table stored in a memory operatively connected to the processor, a first object in response to invoking the successive mode, the first selection of the first SZ, and the first selection of the second SZ;

identifying, by the processor, a validation of the first object after selecting the first object;

producing, by the processor, the first object in response to receiving the validation;

identifying, by the processor, a second activation of the first SZ;

identifying, by the processor, a second activation of the second SZ;

identifying, by the processor, a second time delay between the second activation of the first SZ and the second activation of the second SZ;

invoking, by the processor and in response to the second time delay being less than the first time delay threshold, a simultaneous mode; and selecting, by the processor and from the first active table, a second object in response to invoking the simultaneous mode, the second selection of the first SZ, and the second selection of the second SZ.

2. The method of claim 1, further comprising:
identifying an activation of a third SZ of the plurality of sensitive zones after invoking the simultaneous mode; and selecting, from the first active table, the first object in response to invoking the simultaneous mode, the second activation of the first SZ, the second activation of the second SZ, and the activation of the third SZ.

3. The method of claim 1, wherein the second activation of the second SZ is identified before the second activation of the first SZ.

4. The method of claim 1, wherein at least one object in the first active table can only be selected in successive mode.

5. The method of claim 1, further comprising:
displaying a strip comprising a plurality of boxes corresponding to a plurality of objects in the first active table and the means for activating each of the plurality of boxes.

6. The method of claim 5, further comprising:
identifying an activation of a third SZ of the plurality of sensitive zones before identifying the first activation of the second SZ;
identifying, from the first active table, a third object in response to at least the activation of the third SZ and the first activation of the first SZ;
placing an emphasis on a box corresponding to the third object in response to identifying the third object;
identifying a release of the third SZ after displaying the label with;
deactivating the third SZ after a second time delay threshold following the release; and
removing the emphasis in response to deactivating the third SZ.

7. The method of claim 6, wherein placing the emphasis comprises highlighting the box.

8. The method of claim 6, wherein placing the emphasis comprises displaying a label describing a functionality of the third object.

9. The method of claim 5, further comprising:
highlighting a portion of the grid corresponding to the first SZ in response to the first activation of the first SZ.

10. The method of claim 5, further comprising:
selecting a second active table, wherein at least one of the plurality of boxes corresponds to the second active table.

11. The method of claim 1, further comprising vibrating the first SZ in response to the first activation of the first SZ.

12. The method of claim 1, wherein the validation comprises a release of the first SZ and a release of the second SZ within a second time delay threshold.

13. The method of claim 1, further comprising:
identifying a first activation of a third sensitive zone (SZ) of the plurality of sensitive zones;
selecting, solely in response to the activation of the third sensitive zone, a third object; and
producing the third object.

14. A data entry device (DED) comprising:
a processor;
a plurality of sensitive zones operatively connected to the processor; and a memory operatively connected to the processor and storing an active table comprising a plurality of objects and a plurality of instructions comprising functionality to:
identify a first activation of a first sensitive zone (SZ) of the plurality of sensitive zones by a user;
identify a first activation of a second SZ of the plurality of sensitive zones after identifying the first activation of the first SZ;
identify a first time delay between the first activation of the first SZ and the first activation of the second SZ;
invoke, in response to the first time delay exceeding a first time delay threshold, a successive mode;
select, from the active table, a first object in response to invoking the successive mode, the first selection of the first SZ, and the first selection of the second SZ;
produce the first object after identifying a validation of the first object;
identify a second activation of the first SZ;
identify a second activation of the second SZ;
identify a second time delay between the second activation of the first SZ and the second activation of the second SZ;
invoke, in response to the second time delay being less than the first time delay threshold, a simultaneous mode; and
select, from the first active table, a second object in response to invoking the simultaneous mode, the second selection of the first SZ, and the second selection of the second SZ.

15. The DED of claim 14, the plurality of instructions further comprising functionality to:
identify an activation of a third SZ of the plurality of sensitive zones after the simultaneous mode is invoked; and
select, from the active table, the first object in response to the simultaneous mode being invoked, the second activation of the first SZ, the second activation of the second SZ, and the activation of the third SZ.

16. The DED of claim 14, further comprising:
a display device displaying a strip comprising a plurality of boxes corresponding to a plurality of objects;
a first main zone comprising the first SZ; and
a second main zone comprising the second SZ.

17. The DED of claim 14, wherein the first object corresponds to a computer program, and wherein producing the first object comprises executing the computer program.

18. The DED of claim 14, wherein the first SZ corresponds to a first letter, wherein the second SZ corresponds to a second letter, and wherein the first object comprises a suggested word comprising the first letter and the second letter.

19. The DED of claim 14, wherein at least one selected from the first object and the second object is an image.

20. A non-transitory computer readable storage medium storing a plurality of instructions for entering data on a data entry device (DED) comprising a plurality of sensitive zones, the plurality of instructions comprising functionality to:
identify a first activation of a first sensitive zone (SZ) of the plurality of sensitive zones;
identify a first activation of a second SZ of the plurality of sensitive zones after identifying the first activation of the first SZ;
identify a first time delay between the first activation of the first SZ and the first activation of the second SZ;
invoke, in response to the first time delay exceeding a first time delay threshold, a successive mode;

select, from the active table, a first object in response to invoking the successive mode, the first selection of the first SZ, and the first selection of the second SZ;
identify a validation of the first object after the first object is selected;
produce the first object in response to the validation;
identify a second activation of the first SZ;
identify a second activation of the second SZ;
identify a second time delay between the second activation of the first SZ and the second activation of the second SZ;
invoke, in response to the second time delay being less than the time delay threshold, a simultaneous mode; and
select, from the active table, a second object in response to invoking the simultaneous mode, the second selection of the first SZ, and the second selection of the second SZ.

21. The non-transitory computer readable storage medium of claim 20, the plurality of instructions further comprising functionality to:
identify an activation of a third SZ of the plurality of sensitive zones after the simultaneous mode is invoked; and
select, from the active table, the first object in response to the simultaneous mode being invoked, the second activation of the first SZ, the second activation of the second SZ, and the activation of the third SZ.

22. A method of entering data on a data entry device (DED) comprising a plurality of sensitive zones, comprising:
identifying, by a processor, a first activation of a first sensitive zone (SZ) of the plurality of sensitive zones by a user;
identifying, by the processor, a first activation of a second SZ of the plurality of sensitive zones after identifying the first activation of the first SZ;
identifying, by the processor, a first time delay between the first activation of the first SZ and the first activation of the second SZ;
invoking, by the processor and in response to the first time delay exceeding a time delay threshold, a successive mode;
selecting, by the processor and from an active table stored in a memory operatively connected to the processor, a first object in response to invoking the successive mode, the first selection of the first SZ, and the first selection of the second SZ after the first selection of the first SZ;
identifying, by the processor, a validation of the first object after selecting the first object;
producing, by the processor, the first object in response to receiving the validation of the first object;
identifying, by the processor, a second activation of the second SZ;
identifying, by the processor, a second activation of the first SZ after identifying the second activation of the second SZ;
identifying, by the processor, a second time delay between the second activation of the second SZ and the second activation of the first SZ;
invoking, by the processor and in response to the second time delay exceeding the time delay threshold, the successive mode;
selecting, by the processor and from an active table, a second object in response to invoking the successive mode, the second selection of the second SZ, and the second selection of the first SZ after the second selection of the first SZ;
identifying, by the processor, a validation of the second object after selecting the second object;
producing, by the processor, the second object in response to receiving the validation of the second object;
identifying, by the processor, a third activation of the first SZ;
identifying, by the processor, a third activation of the second SZ;
identifying, by the processor, a third time delay between the third activation of the first SZ and the third activation of the second SZ;
invoking, by the processor and in response to the third time delay being less than the time delay threshold, a simultaneous mode; and
selecting, by the processor and from the active table, an object selected from a group consisting of the first object and the second object, in response to invoking the simultaneous mode, the third selection of the first SZ, the third selection of the second SZ, and a disambiguation scheme.

* * * * *